(12) United States Patent
Ojima et al.

(10) Patent No.: US 7,867,662 B2
(45) Date of Patent: Jan. 11, 2011

(54) CONTACTOR FAILURE DETECTING APPARATUS FOR FUEL CELL SYSTEM

(75) Inventors: Kuniaki Ojima, Yuki (JP); Minoru Sasaki, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 711 days.

(21) Appl. No.: 11/801,720

(22) Filed: May 10, 2007

(65) Prior Publication Data

US 2007/0264547 A1 Nov. 15, 2007

(30) Foreign Application Priority Data

May 10, 2006 (JP) ............................. 2006-131387

(51) Int. Cl.
*H01M 8/04* (2006.01)
(52) U.S. Cl. .................. 429/432; 429/430; 429/428
(58) Field of Classification Search ............... 429/432, 429/430, 428, 400
See application file for complete search history.

(56) References Cited

U.S. PATENT DOCUMENTS

| | | | |
|---|---|---|---|
| 5,677,839 A | 10/1997 | Kondo et al. | |
| 6,158,537 A * | 12/2000 | Nonobe | ........................ 429/13 |
| 6,255,008 B1 * | 7/2001 | Iwase | ............................ 429/9 |
| 2004/0219399 A1 * | 11/2004 | Zhu et al. | ...................... 429/13 |

FOREIGN PATENT DOCUMENTS

| | | |
|---|---|---|
| JP | 02-051868 | 2/1990 |
| JP | 6-243768 | 9/1994 |
| JP | 6-257906 | 9/1994 |
| JP | 7-33033 | 2/1995 |
| JP | 8-159924 A1 | 6/1996 |
| JP | 2003-331893 | 11/2003 |

OTHER PUBLICATIONS

Japanese Office Action for Application No. 2006-131387, dated May 7, 2008.

* cited by examiner

*Primary Examiner*—Helen O Conley
(74) *Attorney, Agent, or Firm*—Anthony A. Laurentano, Esq.

(57) ABSTRACT

A contactor electrically connects and disconnects a fuel cell from a load. When a failure-detecting mode for detecting a closing failure of a contactor is initiated, an opening command is transmitted to the contactor, and a DC/DC converter connected to a motor changes the load voltage. Then, the load voltage and a fuel cell voltage are compared with each other. If the contactor is in a normal open state, as a result of the opening command, the fuel cell voltage is constant, whereas the load voltage of the DC/DC converter decreases, thereby producing a voltage difference. A closing failure of the contactor is determined when it is detected that the fuel cell voltage is substantially equal to the load voltage.

3 Claims, 12 Drawing Sheets

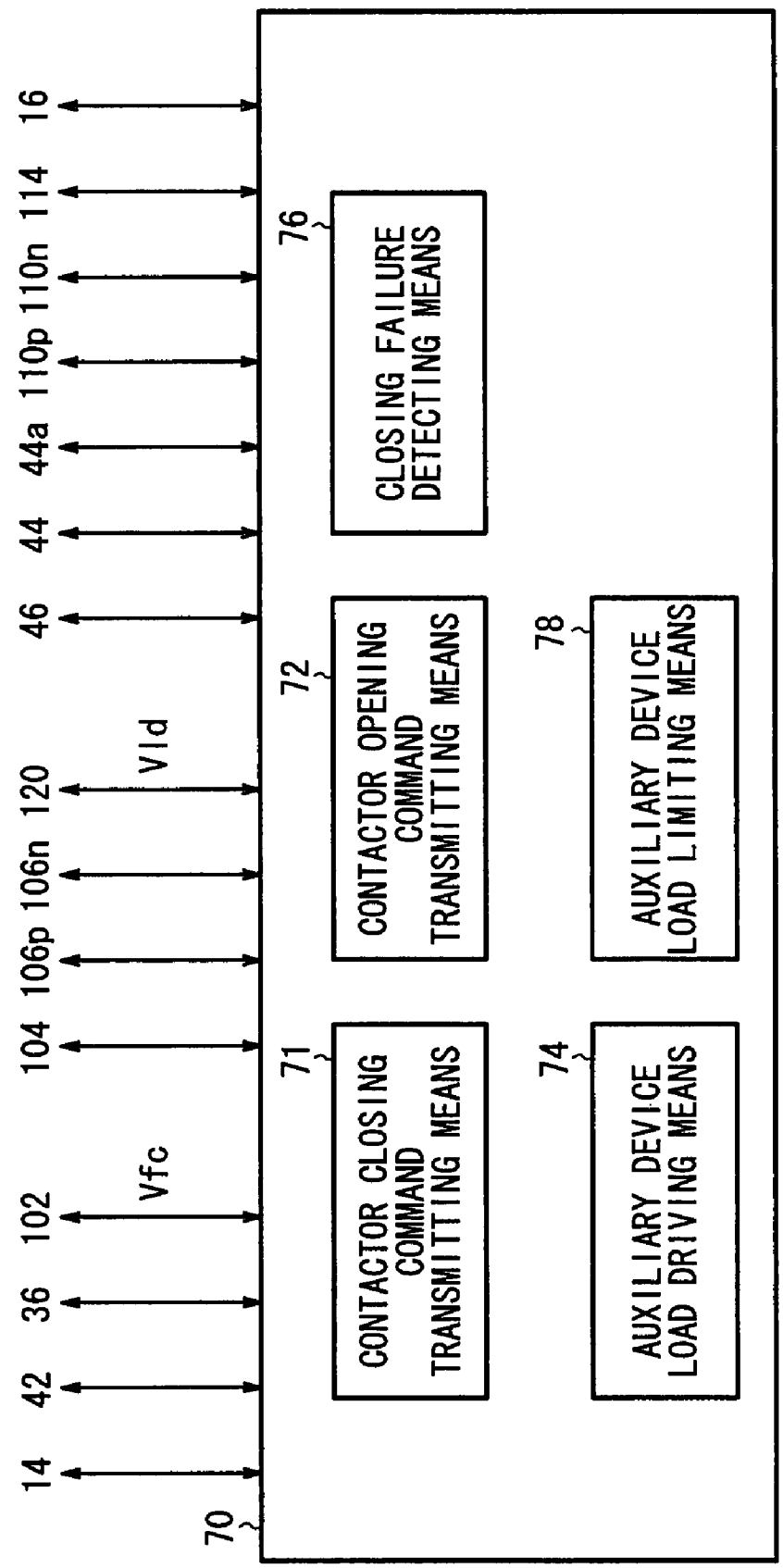

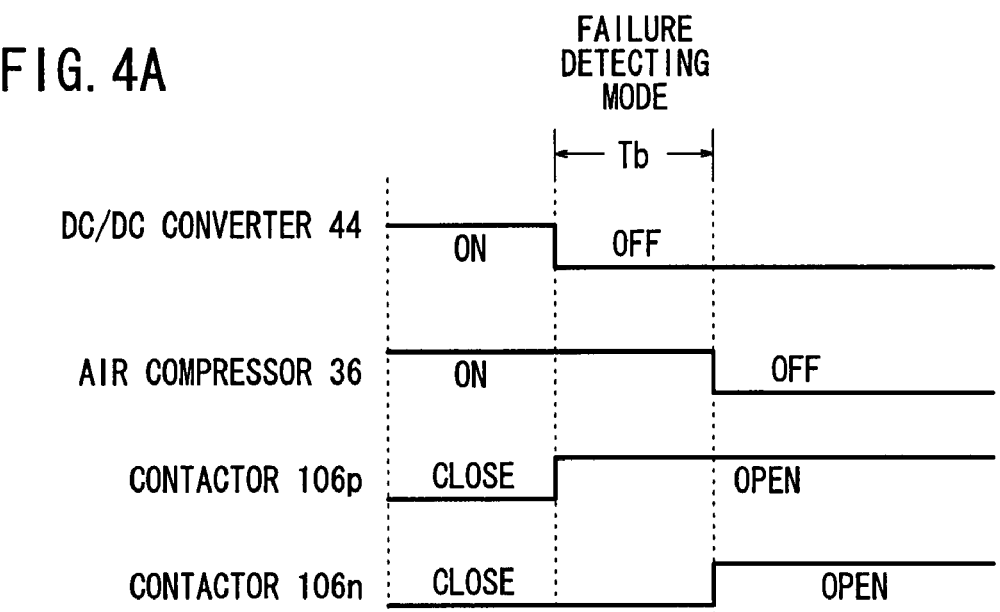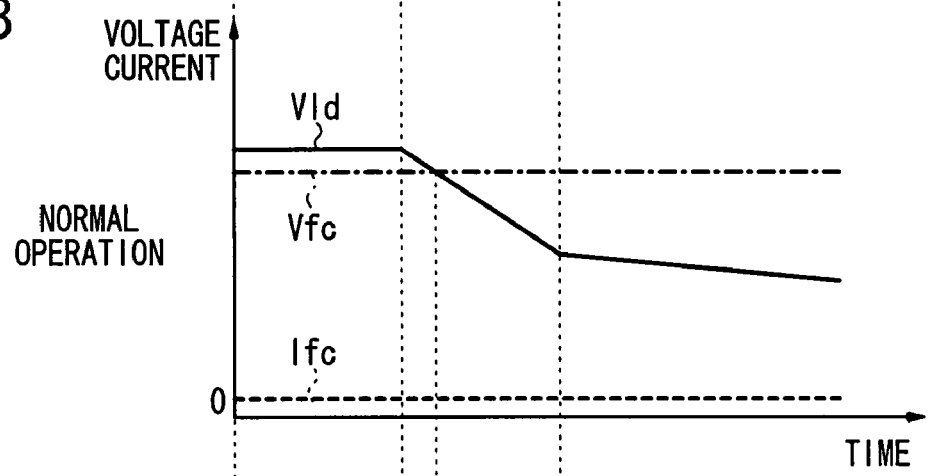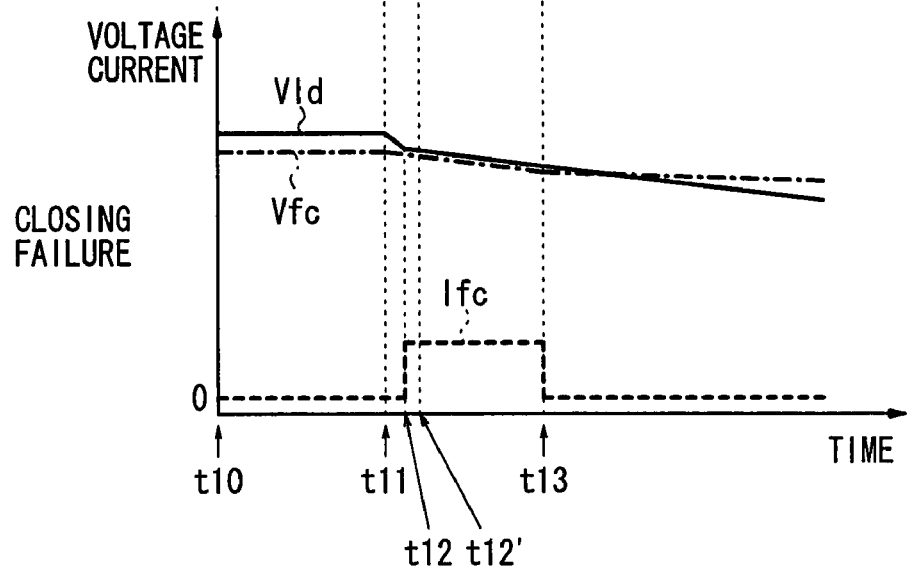

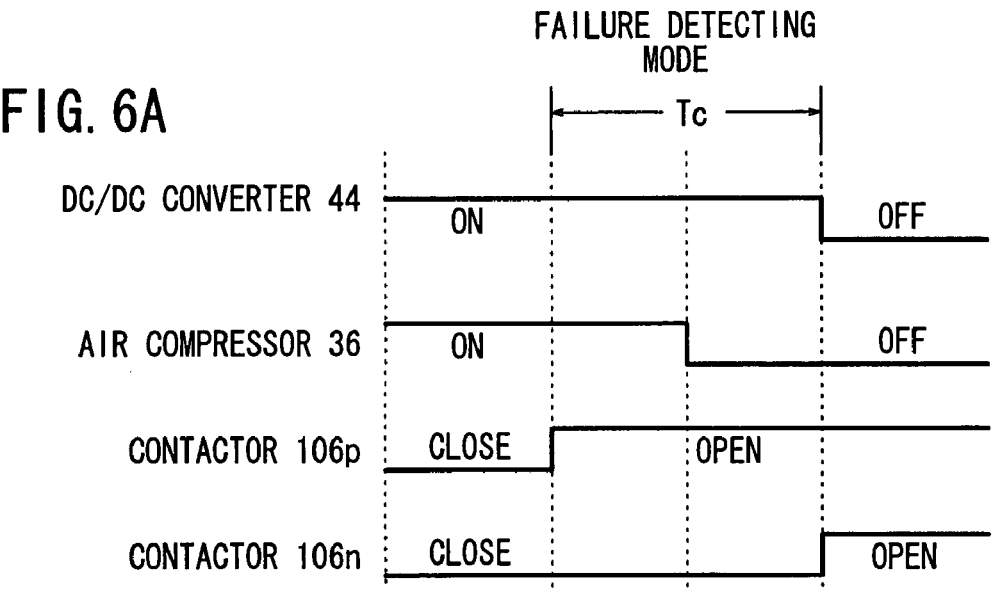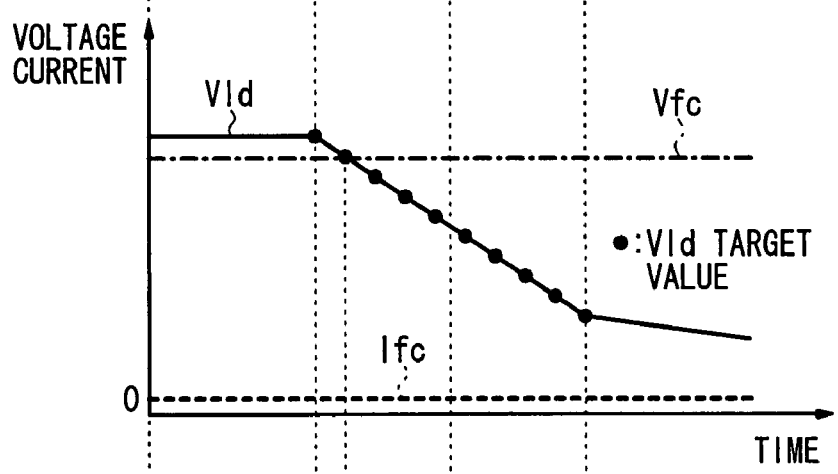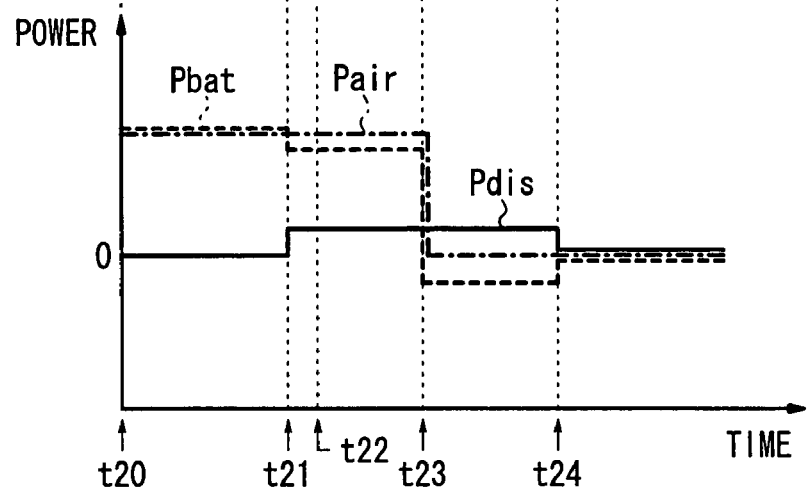

CONTACTOR FAILURE DETECTING APPARATUS FOR FUEL CELL SYSTEM

BACKGROUND OF THE INVENTION

1. Field of the Invention

The present invention relates to a contactor failure detecting apparatus for a fuel cell, for detecting failure of a contactor provided between the fuel cell and a load that is supplied with electrical energy from the fuel cell, wherein the contactor serves for connecting or disconnecting the load with the fuel cell.

2. Description of the Related Art

For example, a polymer electrolyte fuel cell employs a membrane electrode assembly, which includes an anode (fuel electrode) and a cathode (air electrode), and a polymer electrolyte membrane interposed between the electrodes. The electrolyte membrane acts as an ion exchange membrane. The membrane electrode assembly is sandwiched between a pair of separators. A fuel gas flow field is formed between the anode and one of the separators, and an oxygen-containing gas flow field is formed between the cathode and the other separator. In use, normally, a predetermined number of membrane electrode assemblies and separators are stacked together to form a fuel cell stack.

In the fuel cell, a fuel gas such as a hydrogen-containing gas is supplied to the fuel gas flow field. The fuel gas flows through the fuel gas flow field along the anode. The catalyst of the anode induces a chemical reaction of the fuel gas, so as to split hydrogen molecules into hydrogen ions and electrons. The hydrogen ions move toward the cathode through a suitably humidified electrolyte membrane, and the electrons flow through an external circuit to the cathode, thereby creating DC electrical energy. An oxygen-containing gas such as air is supplied to the oxygen-containing gas flow field, wherein the oxygen-containing gas flows along the cathode for inducing a reaction. At the cathode, hydrogen ions from the anode combine with electrons and oxygen to produce water. Water is retained at the anode as a result of back diffusion from the cathode, high humidification of the fuel gas, or the like.

If water is retained excessively at either of the electrodes, water clogging may occur, thereby reducing the power generation efficiency of the fuel cell system. Heretofore, there has been proposed a technique for scavenging both sides of the anode and cathode, as disclosed in Japanese Laid-Open Patent Publication No. 2003-331893. In the above technique, operation of the fuel cell system is started or stopped in order to achieve a desired performance when initiating a subsequent operation of the fuel cell system, wherein oxygen-containing gas is supplied to the anode as well as to the cathode, for removing water produced during power generation from the membrane electrode assembly or from the fuel cell separators.

Also, as disclosed in Japanese Laid-Open Patent Publication No. 2-51868, a fuel cell system includes a contactor that acts as an opening and closing switch, disposed between the fuel cell and a load supplied with electrical energy from the fuel cell. Such a fuel cell system further includes an auxiliary power supply for supplying electrical energy to auxiliary device loads, such as a CPU, an air compressor, a pump, a valve, a heater, etc., when operation of the fuel cell is started and stopped.

When the fuel cell system is applied to a vehicle, according to one proposal, an energy storage device serving as an auxiliary power supply is mounted in the vehicle in parallel with the fuel cell for driving the motor. This technique is adopted, e.g., for achieving a desired response in the fuel cell system, when the fuel cell system is operated variably in accordance with an input for the driving power, and for supplying electrical energy to auxiliary device loads, such as an air compressor of the fuel cell system, when operation of the fuel cell is started, wherein the energy storage device is charged using regenerative energy of the motor when the vehicle is decelerated, so as to use the energy for assistance during a subsequent acceleration, thereby achieving an improvement in fuel cell vehicle efficiency.

Further, the fuel cell system includes a contactor disposed between the fuel cell and a load supplied with electrical energy from the fuel cell, for connecting or disconnecting the load from the fuel cell. In this case, when a relatively large load is connected to the fuel cell, a movable contact of the contactor often becomes meltingly adhered to a fixed contact thereof. Stated otherwise, there is the disadvantage that a "closing failure" may occur.

However, a technique for detecting closing failure due to such melting adhesion, etc., of the contactor provided between the fuel cell and the load has heretofore been unknown.

SUMMARY OF THE INVENTION

The present invention has been made taking these problems into consideration, wherein an object of the present invention is to provide a contactor failure detecting apparatus for a fuel cell system, which is capable of detecting failure of a contactor disposed between the fuel cell and a load supplied with electrical energy from the fuel cell, wherein the contactor acts to both connect and disconnect the load from the fuel cell.

Another object of the present invention is to provide a contactor failure detecting apparatus for a fuel cell system, which is capable of detecting failure of a contactor disposed between the fuel cell and a load supplied with electrical energy from the fuel cell in a short period of time, wherein the contactor acts to both connect and disconnect the load from the fuel cell.

According to the present invention, a contactor failure detecting apparatus for use in a fuel cell system comprises a fuel cell operated to generate power by reaction of a fuel gas and an oxygen-containing gas, a load driven by an output from the fuel cell, a contactor that is opened and closed for electrically connecting and disconnecting the fuel cell with the load, the contactor having one end connected to an output side of the fuel cell and another end connected to the load, a DC/DC converter capable of voltage variable control or current variable control, having one end thereof connected to a load side of the contactor and another end thereof connected to an energy storage device, and a control device. The control device transmits an opening command to the contactor when the contactor is in a closed state, and thereafter changes the voltage or current on the load side of the DC/DC converter and monitors a change in at least one of a voltage, a current, and an electrical power on at least one of a fuel cell side and a load side of the contactor, for thereby detecting a closing failure of the contactor.

According to the present invention, the control device transmits an opening command to the contactor, and thereafter changes either a voltage or a current on the load side of the DC/DC converter. Then, the control device monitors a change in at least one of a voltage, a current and an electrical power, on at least one of a fuel cell side and a load side of the contactor, for thereby detecting a closing failure of the contactor. Therefore, when the contactor does not experience a closing failure, i.e., when the contactor is brought into a normal opened state in response to the opening command, the output voltage on the fuel cell side of the contactor remains constant, or the output current on the fuel cell side of the contactor is zero, whereas the voltage on the load side of the contactor decreases. Therefore, when the voltage or current on the load side of the DC/DC converter changes, the control device monitors such changes in at least one of a voltage, a current, and an electrical power, on at least one of a fuel cell side and a load side of the contactor, for thereby detecting a closing failure of the contactor.

Since the control device controls changes in the voltage or current on the load side of the DC/DC converter, it is possible to detect failures quickly.

In this case, when the control device changes the voltage or current on the load side of the DC/DC converter, the control device controls the change in the voltage or current on the load side of the DC/DC converter such that the electrical power of the fuel cell is equal to or smaller than a predetermined electrical power limit value. Therefore, the fuel cell can be prevented from becoming overloaded, thereby avoiding degradation in performance of the fuel cell.

Also, an air compressor for supplying oxygen-containing gas to the fuel cell is connected to the load through an electrical input of the air compressor, wherein the control device drives the air compressor for scavenging the fuel cell, while detecting a closing failure of the contactor. Thus, a long down time of the fuel cell system, as a result of detecting a failure of the contactor, can be prevented.

According to the present invention, a contactor failure detecting apparatus for use in a fuel cell system comprises a fuel cell operated to generate power by reaction of a fuel gas and an oxygen-containing gas, a DC/DC converter for increasing an output voltage of the fuel cell so as to achieve a predetermined voltage, a load driven by an output voltage of the DC/DC converter, a contactor which is opened and closed in order electrically connect and disconnect the fuel cell with respect to the load through the DC/DC converter, the contactor having one end connected to an output side of the fuel cell and another end thereof connected to an input side of the DC/DC converter, and a control device. The control device transmits an opening command to the contactor while the contactor is in a closed state, and thereafter changes the voltage or current on an input side of the DC/DC converter, while monitoring a change in at least one of a voltage, a current and an electrical power on at least one of a fuel cell side of the contactor and an input side of the DC/DC converter, for thereby detecting a closing failure of the contactor.

According to the present invention, the control device transmits an opening command to the contactor, and thereafter changes the voltage on the output side of the DC/DC converter, which is connected to the load. Then, the control device monitors changes in at least one of a voltage, a current and an electrical power on at least one of a fuel cell side of the contactor and an input side of the DC/DC converter, for thereby detecting a closing failure of the contactor. Therefore, when the contactor does not experience a closing failure, i.e., when the contactor is brought into a normal opened state, in response to the opening command the output voltage on the fuel cell side of the contactor remains constant, whereas the voltage on the input side of the DC/DC converter of the contactor decreases. Therefore, when the voltage or current on the input side of the DC/DC converter changes, the control device can monitor changes in at least one of a voltage, a current and an electrical power on at least one of a fuel cell side of the contactor and an input side of the DC/DC converter, for thereby detecting a closing failure of the contactor.

Since the control device controls changes in the current or voltage on the input side of the DC/DC converter, it is possible to detect contactor failures quickly.

In this case, when the control device changes the voltage or current on the input side of the DC/DC converter, the control device controls such changes in voltage or current on the input side of the DC/DC converter such that the electrical power of the fuel cell is equal to or smaller than a predetermined electrical power limit value. Thus, overloading of the fuel cell can be avoided, thereby preventing degradation in performance of the fuel cell.

Further, an air compressor for supplying an oxygen-containing gas to the fuel cell is connected to the load side thereof through an electrical input of the air compressor, whereby the control device drives the air compressor in order to perform scavenging of the fuel cell, while also detecting a closing failure of the contactor. Thus, a long down time of the fuel cell system, as a result of detecting a failure of the contactor, can be avoided.

According to the present invention, a closing failure of a contactor, which is disposed between a fuel cell and a load supplied with electrical energy from the fuel cell, can be detected.

Also, according to the present invention, an opening command is transmitted to a contactor that is disposed between a fuel cell and a load supplied with electrical energy from the fuel cell. Thereafter, a voltage or current on the contactor side of a DC/DC converter is controlled. Then, a change in at least one of a voltage, a current and an electrical power on at least one of a fuel cell side and a load side of the contactor is monitored. Thus, closing failures of the contactor can be detected quickly.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a diagram showing a function achieving means of a CPU.

FIG. 4A is a time chart showing operations during a failure detecting mode according to a second basic technique;

FIG. 4B is a characteristic graph showing changes in current and voltage when a contactor does not experience a closing failure, according to the second basic technique;

FIG. 4C is a characteristic graph showing changes in current and voltage when a contactor experiences a closing failure, according to the second basic technique;

FIG. 6A is a time chart showing operations during a failure detecting mode according to a first example;

FIG. 6B is a characteristic graph showing changes in current and voltage when a contactor does not experience a closing failure, according to the first example;

FIG. 6C is a characteristic graph showing changes in electrical power when a contactor experiences a closing failure, according to the first example;

DESCRIPTION OF THE PREFERRED
EMBODIMENTS

Hereinafter, embodiments of the present invention shall be described with reference to the drawings.

Figure 1:
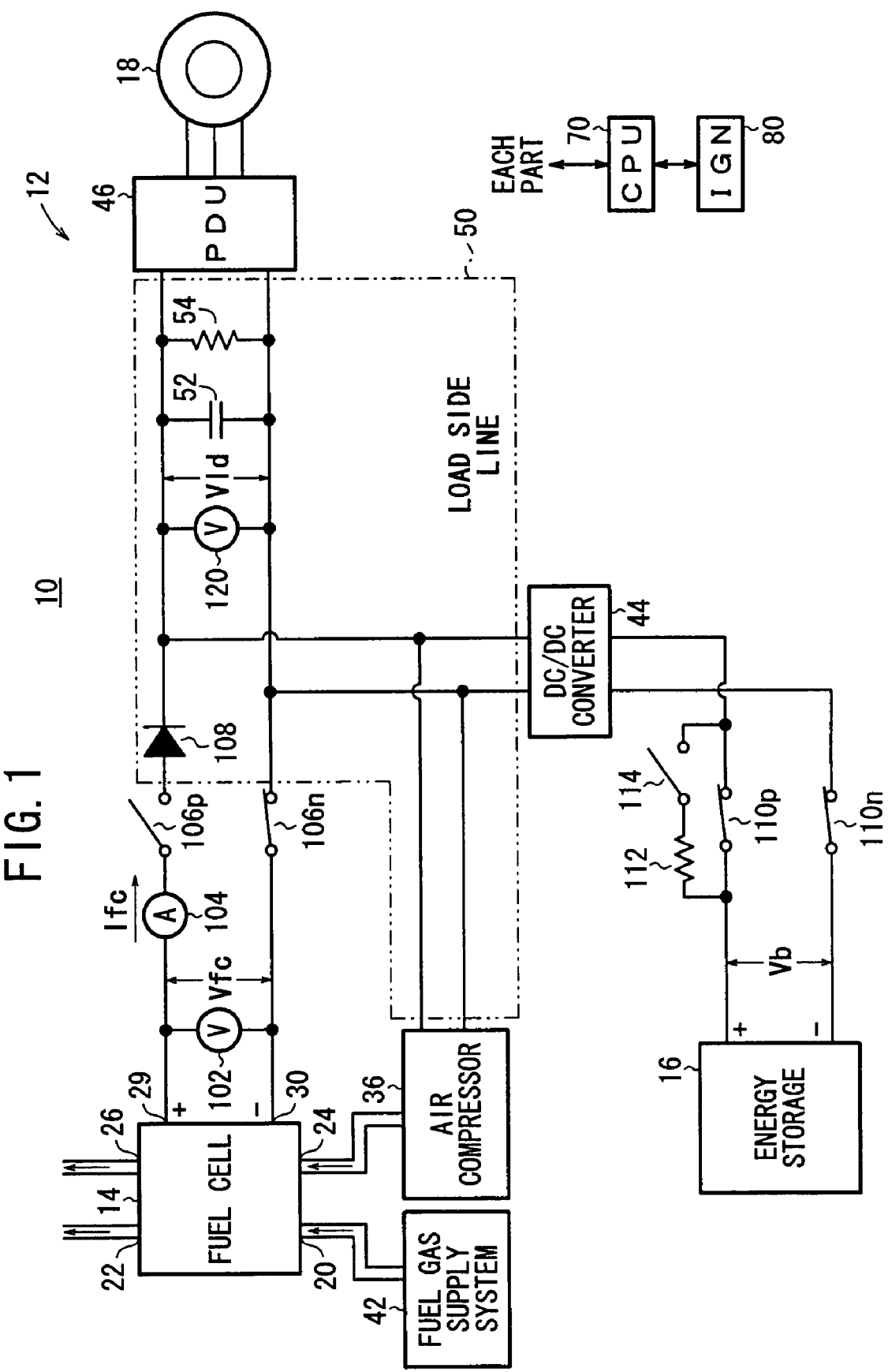
FIG. 1 is a circuit diagram showing schematically a fuel cell vehicle equipped with a fuel cell system according to a first example of an embodiment of the present invention.

FIG. 1 is a diagram showing schematically the structure of a fuel cell vehicle 12, including a fuel cell system 10 according to an embodiment of the present invention.

The fuel cell vehicle 12 basically is made up of a fuel cell 14, an energy storage device 16, a motor 18, a fuel gas supply system 42, and an air compressor 36. The energy storage device 16 is connected to the fuel cell 14 through a DC/DC converter 44, for supplementing the output of the fuel cell 14. The fuel cell 14 and the energy storage device 16 drive the motor 18, which forms a load, through a power drive unit (PDU) 46, thereby causing the vehicle 12 to run. The fuel gas supply system 42 supplies a fuel gas to the fuel cell 14. The air compressor 36 supplies an oxygen-containing gas to the fuel cell 14. A secondary battery, such as a capacitor, which is chargeable up to several hundred volts, is used as the energy storage device 16.

The fuel cell 14 has a stack structure formed by stacking a plurality of cells, each of which includes an anode, a cathode, and a solid polymer electrolyte membrane interposed between the anode and the cathode.

The fuel cell 14 has a hydrogen supply port 20 for supplying a fuel gas, such as hydrogen ($H_2$) gas, from the fuel gas supply system 42, a hydrogen discharge port 22 for discharging an exhaust gas from the fuel cell 14 (the exhaust gas also contains hydrogen gas that has not been consumed during power generation), an air supply port 24 for supplying air, which makes up the oxygen ($O_2$)-containing gas, from the air compressor 36, and an air discharge port 26 for discharging air containing unconsumed oxygen from the fuel cell 14.

The air compressor 36 is an auxiliary device formed integrally with an air compressor motor for supplying compressed atmospheric air. Since during normal power generation operation of the fuel cell 14 the contactors (FC contactors) 106p, 106n are respectively in a closed state, the air compressor 36 is driven by a high voltage (fuel cell voltage Vfc in FIG. 1) supplied from the fuel cell 14 through a diode 108.

A voltmeter 102 is connected between the output terminals 29, 30 of the fuel cell 14, for measuring the fuel cell voltage Vfc.

The fuel cell voltage Vfc formed between the output terminals 29, 30 of the fuel cell 14 is applied to the PDU 46 for driving the motor 18. The fuel cell voltage Vfc is supplied through an amperemeter 104 that measures the fuel cell current Ifc, the contactors 106p, 106n in a closed state, and the diode 108. The fuel cell voltage Vfc further is applied to a high voltage side of the DC/DC converter 44, as well as to the air compressor 36.

Contactors 110p and 110n are provided between the DC/DC converter 44 and the energy storage device 16. A series circuit, made up of a resistor 112 and a switch 114, for preventing current inrush and for trickle charging, is connected in parallel to the contactor 110p between the fixed and moving contacts thereof.

A condenser 52 having a capacitance value C and a discharge resistor 54 having a resistance value R are connected to the input side of the PDU 46. The condenser 52 allows the fuel cell voltage Vfc of the fuel cell 14 to be supplied as a stable load voltage Vld when the contactors 106p, 106n are placed in a closed state, so as to connect the PDU 46 to the output of the fuel cell 14. The resistor 54 serves for discharging the load voltage Vld when the contactors 106p, 106n are switched so as to assume an opened state. Further, a voltmeter 120 for measuring the load voltage Vld is connected to a load side line 50, which is shown as being surrounded by the dashed two-dotted line in FIG. 1.

The DC/DC converter 44 is a bi-directional converter (convertible in both directions). The DC/DC converter 44 has a down-convert function to decrease the load voltage Vld (the fuel cell voltage Vfc from the fuel cell 14 or a voltage from the PDU 46 during regeneration of the motor 18), and to supply electrical energy to the energy storage device 16 at the decreased voltage. Further, the DC/DC converter 44 has an up-convert function to increase a stored energy voltage Vb, and to supply electrical energy to the PDU 46 and to the air compressor 36 at the increased voltage. Stated otherwise, the DC/DC converter 44 can change (feedback control) the load voltage Vld or the energy storage voltage Vb on both sides of the converter 44, so as to achieve a desired value corresponding to an output voltage command of a control device 70, to be described later. However, the DC/DC converter 44 is not limited to a voltage control type of converter, which is operated depending on an output voltage command. The DC/DC converter 44 may also be a current control type of converter, which is operated depending on an output current command.

Further, a control device (CPU) 70 is provided in the fuel cell system 10 and in the fuel cell vehicle 12 that is equipped with the fuel cell system 10. The control device 70 is connected to an ignition switch 80, which serves as a start-stop switch for the fuel cell vehicle 12. The control device 70 controls overall operations of the fuel cell system 10.

The control device 70 comprises a computer, including a CPU, ROM, RAM, a timer and other interfaces, wherein the control device 70 operates as a means for achieving various functions based on various inputs by executing programs stored in a memory. As shown in FIG. 2, the control device 70 operates as a contactor closing command transmitting means 71, for transmitting a closing command to close the contactors 106$p$, 106$n$, and as a contactor opening command transmitting means 72 for transmitting an opening command to the contactor 106$p$ to open the contactor 106$p$ when the contactors 106$p$, 106$n$ are in a closed state. Further, the control device 70 operates as an auxiliary device load driving means 74 for driving the air compressor 36, making up one auxiliary device load among the loads after transmission of an opening command, and as a closing failure detecting means 76 for detecting a closing failure of the contactor 106$p$ by monitoring at least one of changes in a voltage (Vfc or Vld), a current (Ifc, etc.) and an electrical power (Ifc×Vfc, etc.) on at least one of a fuel cell 14 side and a load side of the contactor 106$p$ during operation of the air compressor 36. Finally, the control device 70 also operates as and an auxiliary device load limiting means 78 for limiting the load value of the air compressor 36 driven by the auxiliary device load driving means 74, so as to remain at a value smaller than a power limit value (the power limit value represents an electrical power that can be acquired from the fuel cell 14), when it is determined that the load value of the air compressor 36 exceeds the power limit value.

As described above, the ignition switch (IGN) 80 is connected to the control device 70. The ignition switch 80 outputs a start-up signal (a signal for starting operation) and a power generation stop request signal, for the fuel cell vehicle 12 and for the fuel cell system 10.

During normal power generation operation of the fuel cell system 10, the control device 70 closes the contactors 106$p$, 106$n$ and the contactors 110$p$, 110$n$ and drives the air compressor 36 to supply air (oxygen) to the cathode of the fuel cell 14, whereas the fuel gas supply system 42 supplies hydrogen gas to the anode of the fuel cell 14. Thus, the hydrogen becomes ionized at the anode, whereby hydrogen ions move through the solid polymer electrolyte membrane toward the cathode. Electrons produced during an electrochemical reaction are collected as a fuel cell current (power generation current) Ifc utilized in an external circuit.

Thus, during normal power generation of the fuel cell 14 by reaction of the reactant gases supplied to the fuel cell 14, the generated electrical power Ifc×Vfc collected from the fuel cell 14 is supplied to the PDU 46 for driving the motor 18, as well as to (the motor of) the air compressor 36 through the contactors 106$p$, 106$n$ and the diode 108. If any residual electrical power exists after supplying electrical power to the PDU 46 and air compressor 36, such residual electrical power is supplied to the energy storage device 16 through the DC/DC converter 44 and the contactors 110$p$, 110$n$ for charging the energy storage device 16.

As described above, under control of the control device 70, the energy storage device 16 is charged mainly by a voltage that is obtained by decreasing the fuel cell voltage Vfc of the fuel cell 14 by the DC/DC converter 44. When power generation by the fuel cell 14 is stopped, the electrical energy stored in the energy storage device 16 may be supplied to the air compressor 36 as necessary. Electrical power also may be supplied to a heater (not shown) used for warming the fuel cell 14 to assist the output of the fuel cell 14 when the fuel cell 14 is subsequently used at a low temperature, such as a temperature below freezing. It should be noted that when the driving force is transmitted from the drive wheels to the motor 18 during deceleration of the fuel cell vehicle 12, the motor 18 functions as a power generator and thus generates a regenerative braking force, wherein such kinetic energy of the vehicle body is collected as electrical energy. Further, the electrical energy from the motor 18 is regenerated (stored) in the energy storage device 16 through the PDU 46 and the DC/DC converter 44.

The basic structure and operations of the fuel cell system 10, and a fuel cell vehicle 12 equipped with the fuel cell system 10, have been described above. Next, techniques for detecting a closing failure of the contactors 106$p$, 106$n$ of the fuel cell system 10 and the fuel cell vehicle 12 shall be described, in the order of a first basic technique, a second basic technique, a first example, and a second example.

First Basic Technique

The first basic technique for detecting a closing failure shall be described below, with reference to FIGS. 1 and 2 and the time charts shown in FIGS. 3A to 3C.

Figure 3A:
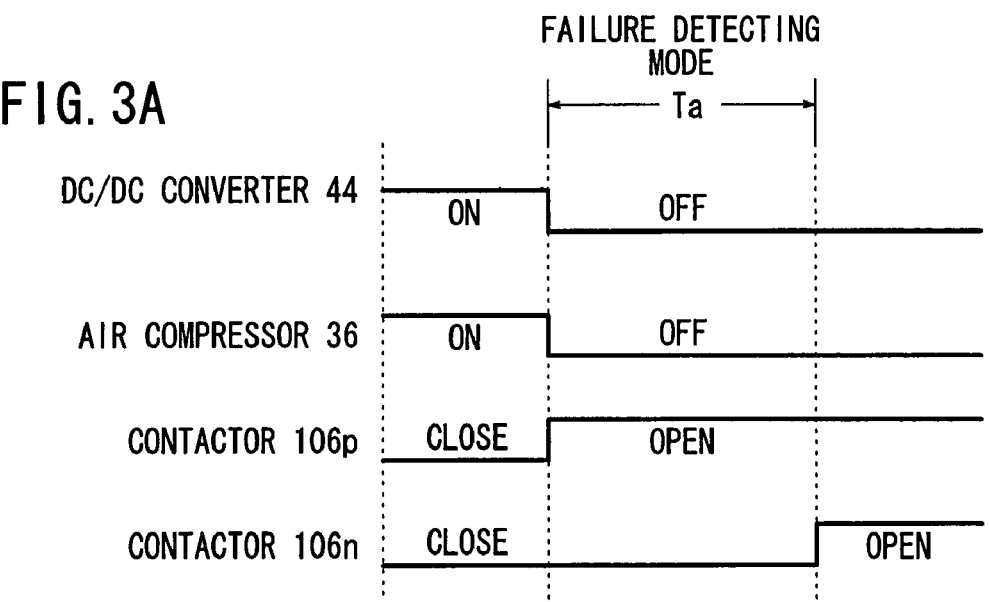
FIG. 3A is a time chart showing operations during a failure detecting mode according to a first basic technique.

For example, when the ignition switch 80 supplies an OFF signal to the control device 70 in order to stop operation of the fuel cell system 10, the contactors 106$p$, 106$n$ and the contactors 110$p$, 110$n$ are placed in a closed state, between time t0 and time t1, prior to entering a failure detecting mode, which begins at time t1 in FIG. 3A, and the DC/DC converter 44 is placed in an ON state. Further, the energy storage voltage Vb of the energy storage device 16 is increased so that the load voltage Vld is made higher than the fuel cell voltage Vfc (Vld>Vfc). Accordingly, the diode 108 assumes a cutoff state, whereby the fuel cell current Ifc is zero.

Once the contactors 106$p$, 106$n$ have been placed in a closed state, the control device 70 turns off the DC/DC converter 44 and the air compressor 36 at time t1, i.e., at the starting time of the failure detecting mode. Further, the contactor opening command transmitting means 72 transmits an opening command to the positive-side (p-side) contactor 106$p$. Thus, the failure detecting mode is initiated.

Figure 3B:
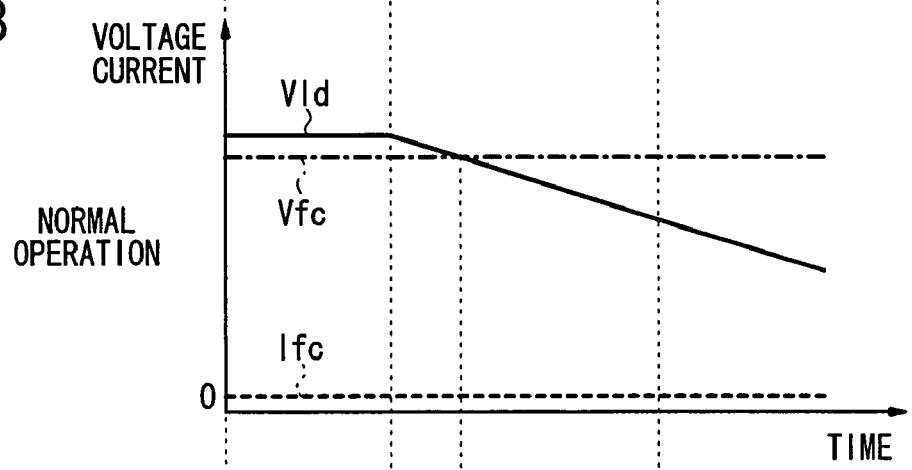
FIG. 3B is a characteristic graph showing changes in current and voltage when a contactor does not experience a closing failure, according to the first basic technique.

If the opening command places the contactor 106$p$ in a normal open state at time t1, then the condenser 52 begins to discharge the stored charge through the discharge resistor 54, so that the load voltage Vld gradually decreases as shown in FIG. 3B. Further, at the ending time t3 of the failure detecting mode, the contactor opening command transmitting means 72 transmits an opening command to the negative-side (n-side) contactor 106$n$, thereby placing the contactor 106$n$ in an open state.

On the other hand, if a closing failure occurs, that is, when the contactor 106$p$ does not open but remains in a closed state due to melting adhesion, etc., of the contacts of the contactor 106$p$, although the opening command is transmitted at time t1, as shown in FIG. 3, the load voltage Vld gradually decreases until time t2 whereupon the diode 108 is switched to a forward biased state, as with the case shown in FIG. 3B. However, after time t2, the load side line 50 and the output terminals 29, 30 of the fuel cell 14 are brought into electrical contact with each other.

In this case, since the fuel cell 14 has a large capacitance component and the discharge resistor 54 is the same as in the normal case, after time t2, the load voltage Vld and the fuel cell voltage Vfc simultaneously decrease with a more gradual slope.

Thus, at the ending time t3 of the failure detection determining time period Ta, after lapse of a predetermined time period from the starting time t1 thereof, the closing failure detecting means 76 can determine and detect a closing failure of the contactor 106$p$, based on characteristic changes in the load voltage Vld with respect to the fuel cell voltage Vfc. For example, unlike the case shown in FIG. 3B, when the load voltage Vld does not become significantly smaller than the fuel cell voltage Vfc, but rather the load voltage Vld remains substantially equal to the fuel cell voltage Vfc as shown in FIG. 3C, the closing failure detecting means 76 determines that the contactor 106p has experienced a closing failure, and thus can detect the closing failure.

Figure 3C:
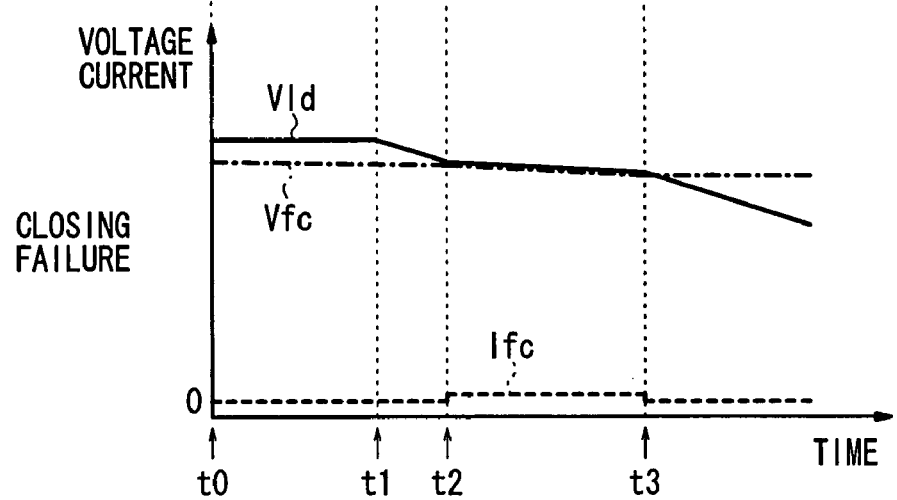
FIG. 3C is a characteristic graph showing changes in current and voltage when a contactor experiences a closing failure, according to the first basic technique.

As shown in FIGS. 3B and 3C, in another example of detecting a closing failure, the closing failure detecting means 76 can detect a closing failure based on the presence or absence of the fuel cell current Ifc (Ifc=0 in the normal state as shown in FIG. 3B, and Ifc>0 in the closing failure state as shown in FIG. 3C), detected during the failure detecting determining time period Ta (time t1 to time t3). However, as is evident from FIG. 3C, since the fuel cell current Ifc, which is formed as a discharge current discharged from the fuel cell 14 after time t2, is minute, a highly sensitive measuring device for measuring the fuel cell current Ifc is required. However, it is generally disadvantageous to employ such an expensive measuring device.

As mentioned above, the first basic technique can detect a closing failure of the positive-side contactor 106p, which is disposed between the fuel cell 14 and the motor 18 as a load supplied with electrical energy from the fuel cell 14.

Further, using the above process, a closing failure of the negative-side contactor 106n can also be detected. For example, a closing failure of the positive-side contactor 106p can be detected during a failure detecting mode while operation of the fuel cell system is presently stopped, and a closing failure of the negative-side contactor 106n can be detected during a failure detecting mode when the operation of the fuel cell is stopped at a subsequent time. Also, closing failure of the contactors 106p, 106n can be detected during an idling time, when operation of the system is not necessarily stopped.

Second Basic Technique

The first basic technique measures a voltage difference (Vld–Vfc) from the starting time t1 of the failure detecting mode after transmission of an opening command to the contactor 106p and to the ending time t3 of the failure detecting mode, and then determines whether a failure of the contactor 106p has occurred. However, since the load voltage Vld decreases gradually, in order to improve the accuracy of the determination (improve S/N ratio), a relatively long predetermined time period is required for the failure detecting determining time period Ta.

Thus, it will be understood that a more rapid decreasing rate of the load voltage Vld after transmission of the opening command to the contactor 106p allows the failure detecting determining time period Ta, i.e., the time period required to detect a failure, to be made shorter.

However, according to the first basic technique, the decreasing rate of the load voltage Vld depends on the capacitance value C of the condenser 52 as well as the resistance value R of the discharge resistor 54, which are disposed on the load side line 50 of the secondary side of the contactors 106p, 106n. Thus, the decreasing rate cannot be increased.

Since the condenser 52 serves a function so as to reduce noise and smooth electrical power, it is difficult to set the capacitance value C to a smaller value. Also, since a smaller resistance value R of the discharge resistor 54 results in a larger power loss during normal power generation, the efficiency, i.e., the fuel consumption efficiency of the system, tends to be decreased disadvantageously. Thus, in view of efficiency, it also is difficult to decrease the resistance value R of the discharge resistor 54.

According to the second basic technique, as described below, the decreasing rate of the load voltage Vld can be increased without requiring any changes to be made to the condenser 52 or to the discharge resistor 54, and without requiring the addition of new devices.

Also, according to the second basic technique, when the contactors 106p, 106n experience a closing failure state, the closing failure of the contactors 106p, 106n can be detected easily within a short period of time, by measuring the fuel cell current Ifc using an inexpensive measuring device having low sensitivity, since the fuel cell current Ifc itself becomes larger.

Figure 5:
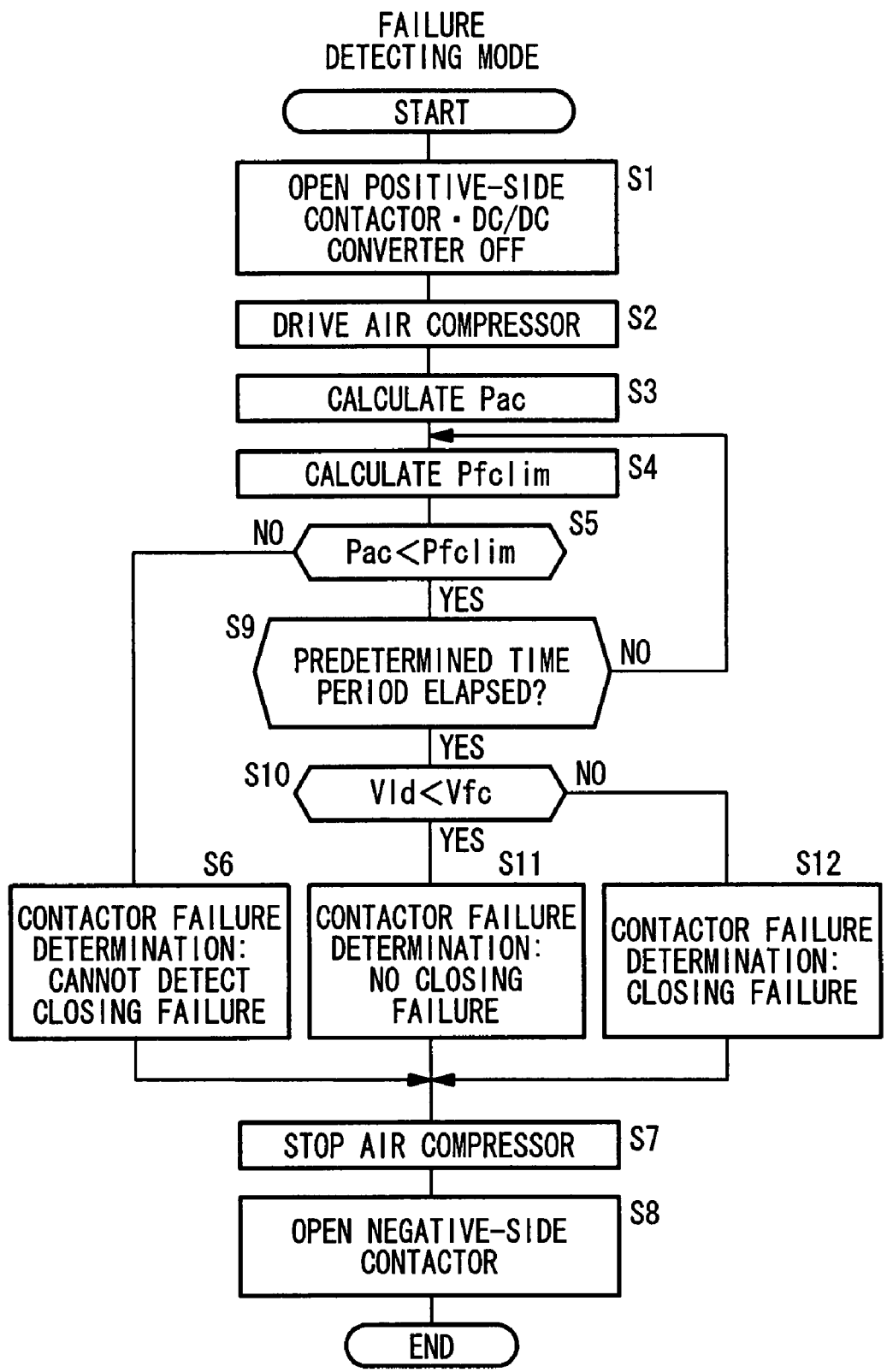
FIG. 5 is a flow chart showing operations according to the second basic technique.

The second basic technique will be described below with reference to the time charts shown in FIGS. 4A to 4C, and with reference to a flowchart indicating operations of the failure detecting mode, as shown in FIG. 5. The main body for executing the system (i.e., for controlling operations of the system) shown by the flowchart is the control device 70. Incidentally, the circuit block diagram is similar to that shown in FIGS. 1 and 2, wherein the software of the control device 70 thereof is changed.

For example, when operation of the fuel cell system 10 is stopped, the contactors 106p, 106n and the contactors 110p, 110n are placed in a closed state, between time t10 and time t11, prior to the failure detecting mode, which starts at time t11 in FIG. 4A, and the DC/DC converter 44 is placed in an ON state. Further, the energy storage voltage Vb of the energy storage device 16 is increased, so that the load voltage Vld is higher than the fuel cell voltage Vfc (Vld>Vfc). Accordingly, the diode 108 is placed in a cutoff state, and thereby, the fuel cell current Ifc becomes zero. Incidentally, operations performed between time t10 and time t11 is the same as those that are performed between time t0 and time t1 in the first basic technique.

When the failure detecting mode is started at time t11, the control device 70 controls the contactor opening command transmitting means 72 so as to transmit an opening command to the positive-side contactor 106p, while turning off the DC/DC converter 44, in step S1.

At time t11, the control device 70 controls the auxiliary device load driving means 74 so as to drive the air compressor 36 as an auxiliary device load, based on an auxiliary device load driving command, in step S2. Incidentally, the auxiliary device load may also include an air conditioner, a heater, a light, and a pump (not shown), in addition to the air compressor 36.

In step S3, the control device 70 calculates the consumption power Pac of the air compressor 36, corresponding to the auxiliary device load driving command in the present failure detecting mode, by searching a map (look-up table), for example.

Next, in step S4, the control device 70 calculates a power limit value Pfclim (Pfclim represents the electrical power that can be collected from the fuel cell 14), based on the pressure and flow rate of the present fuel gas, the fuel cell voltage, the fuel cell temperature, etc.

Then, in step S5, the control device 70 determines whether the consumption power Pac of the air compressor 36, corresponding to the auxiliary device load driving command, is smaller than the power limit value Pfclim, which represents the electrical power that can be collected from the fuel cell 14 (Pac<Pfclim).

The processes from steps S3 to S5 are performed for the following reasons:

When the positive-side contactor 106p experiences a closing failure, the air compressor 36 tends to acquire electrical energy from the fuel cell 14. In such a case, the acquired electrical energy must be limited by the power limit value Pfclim, so as not to deteriorate the performance of the fuel cell 14. Specifically, the auxiliary device load limiting means 78 limits the consumption power of the air compressor 36 to a value smaller than the power limit value Pfclim, representing the electrical power that can be collected from the fuel cell 14.

Thus, if the determination is negative in step S5, i.e., if it is determined that Pac≧Pfclim, the control device 70 records, in a log file, data representing that a closing failure could not be detected within the present contactor failure determination time, in step S6. In this case, the control device 70 then turns off the air compressor 36 in step S7, and switches the negative-side contactor 106n so as to assume an opened state in step S8, whereupon the present failure detecting mode is finished.

If the fuel cell 14 operates normally, then the determination in step S5 is positive. In this case, the control device 70 determines whether the predetermined failure detection determining time period Tb (Tb<Ta) has elapsed, in step S9. If it is determined that the time period Tb has not yet elapsed, control goes back to step S4 in order to reconfirm the processes of steps S4 and S5. If it is determined that the predetermined failure detection determining time period Tb has elapsed, i.e., if the determination is positive in step S9, the control device 70 then determines whether a closing failure of the contactor 106p has occurred or not in step S10.

In step S10, a closing failure is determined based on whether the load voltage Vld is smaller than the fuel cell voltage Vfc (Vld<Vfc).

In this case, if the contactor 106p is in a normal opened state at time t11 in accordance with the opening command in step S1, the condenser 52 discharges the stored charge through the discharge resistor 54, as shown in FIG. 4B. The discharge is consumed by the air compressor 36, and thus the load voltage Vld rapidly decreases, compared to the case shown in FIG. 3B, while the fuel cell voltage Vfc remains constant.

Accordingly, at the ending time t3 of the failure detection determining time period Tb, if the determination is positive in step S10 (Vld<Vfc), the control device 70 records, in a log file, data representing that a closing failure has not occurred during the present contactor failure determination in step S11. Then, the control device 70 turns the air compressor 36 off in step S7, corresponding to time t13, and switches the negative-side contactor 106n so as to assume an opened state in step S8, whereupon the present failure detecting mode is finished.

Incidentally, the failure detection determining time period Tb may be set to be a time period that is obtained by adding a margin of time, in view of variation, to a time period between time t11 and time t12', at which the load voltage Vld becomes smaller than the fuel cell voltage Vfc.

On the other hand, if a closing failure occurs, that is, when the contactor 106p does not open but remains in the closed state due to melting adhesion, etc., of the contacts of the contactor 106p, although an opening command is transmitted in step S1, as shown in FIG. 4C, the load voltage Vld rapidly decreases until time t12, when the diode 108 switches to a forward biased state. However, after time t12, the load side line 50 and the output terminals 29, 30 of the fuel cell 14 remain electrically connected to each other.

In this case, since the fuel cell 14 has a large capacitance component, after time t2, the load voltage Vld and the fuel cell voltage Vfc are simultaneously reduced at a gradual slope. Accordingly, Vld<Vfc, and thus, the determination of Vld<Vfc becomes negative in step S10.

Thus, in step S10, at the ending time t13 of the failure detection determining time period Tb, after lapse of a predetermined time period from the starting time t11, the closing failure detecting means 76 determines and detects a failure of the contactor 106p, based on the fact that the load voltage Vld does not become smaller than the fuel cell voltage Vfc, and in view of the change characteristics in the load voltage Vld as shown in FIG. 4C.

Also, in the case of a closing failure of the contactor 106p, the fuel cell current Ifc is supplied to the air compressor 36 between time t12 and time t13. Thus, when a closing failure occurs, the fuel cell current Ifc also is made larger, as compared with the case shown in FIG. 3C (see FIG. 4C).

In step S12, the control device 70 records, in a log file, data representing that a closing failure has been detected during the present contactor failure determination. Then, the control device 70 turns the air compressor 36 off in step S7, corresponding to time t13, and switches the negative-side contactor 106n so as to assume an opened state, whereupon the present failure detecting mode is finished.

According to the second basic technique, the contactor 106p that connects or disconnects the load side line 50 from the fuel cell 14, is disposed between the fuel cell 14 and the motor 18, which forms a load supplied with electrical energy from the fuel cell 14. The air compressor 36 acts as an auxiliary device load, among the loads that are driven after transmission of an opening command for the contactor 106p. Thus, when the contactor 106p is placed in a normal opened state, the load voltage Vld is reduced significantly (and rapidly), compared to the first basic technique in which the air compressor 36 is not driven. As a result, a closing failure of the contactor 106p can be detected during a failure detection determining time period Tb, which is considerably shorter than the failure detecting determination time Ta (Tb<<Ta).

Incidentally, in order to determine a closing failure in step S10, the following criteria may be used:

A closing failure is determined, (1) if the load voltage Vld does not become smaller than the fuel cell voltage Vfc;

(2) if the fuel cell voltage Vfc changes; or (3) if the fuel cell current Ifc is larger than a predetermined current value.

According to the second basic technique, a closing failure of the negative-side contactor 106n can be detected in a similar manner. For example, a closing failure of the positive-side contactor 106p may be detected during a failure detecting mode when operation is presently stopped, and a closing failure of the negative-side contactor 106n may be detected during a failure detecting mode when operation is stopped at a subsequent time.

First Example

Figure 7A:
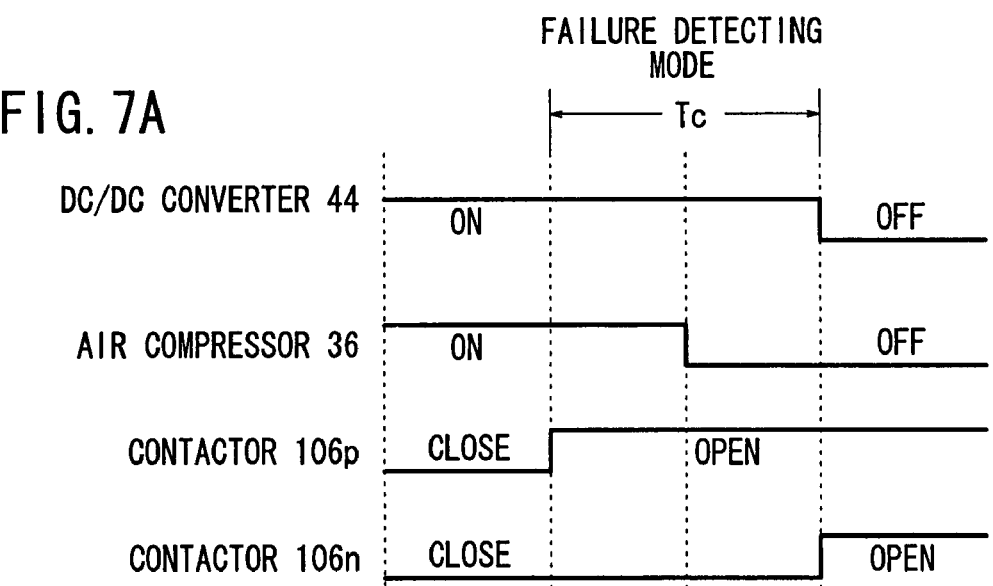
FIG. 7A is similar to FIG. 6A, and is a time chart showing operations during a failure detecting mode according to a first example.

A first example shall be described below, with reference to a time chart illustrating normal operations of the contactor 106p shown in FIGS. 6A to 6C, a time chart illustrating a closing failure state of the contactor 106p shown in FIGS. 7A to 7C, and a flowchart indicating operations of the failure detecting mode shown in FIG. 8. The main body for executing (controlling) operations of the flowchart is the control device 70. In addition, the circuit block diagram is the same as those shown is FIGS. 1 and 2, wherein the software of the control device 70 is changed.

For example, when operation of the fuel cell system 10 is stopped, the contactors 106p, 106n and the contactors 110p, 110n are placed in a closed state between time t20 and time t21, prior to entering the failure detecting mode, which starts at time t21 as shown in FIG. 6A, and the DC/DC converter 44 is placed in an ON state. Further, as shown in FIG. 6B, the energy storage voltage Vb of the energy storage device 16 is increased, so that the load voltage Vld is made higher than the fuel cell voltage Vfc (Vld>Vfc). Accordingly, the diode 108 assumes a cutoff state, and thereby, the fuel cell current Ifc is zero.

Incidentally, the operations between time t20 and time t21 are the same as those between time t0 and time t1 according to the first basic technique, and between time t10 and time t11 according to the second basic technique.

When the failure detecting mode is started at time t21, the control device 70 controls the contactor opening command transmitting means 72 so as to transmit an opening command to the positive-side contactor 106p in step S11. Also, at this time, the control device 70 drives the air compressor 36, in response to a scavenging request of the fuel cell 14 (ex. a request to discharge water produced at the cathode and anode using air, when operation of the system is stopped after a power generation operation has continued for a predetermined time period). In the first example, the air compressor 36 is driven in response to a scavenging request at time t21.

Next, in step S12, the control device 70 calculates a current limit value Ifclim, indicating the current that can be collected from the fuel cell 14, from the pressure, the flow rate of the present fuel gas, the fuel cell voltage, the fuel cell temperature, etc.

Then, in step S13, the control device 70 determines whether the current limit value Ifclim calculated in step S12 is equal to or larger than a predetermined current value (threshold current) Ith (Ifclim≧Ith). When the load voltage Vld is decreased by an output feedback control of the DC/DC converter 44 during the failure detecting mode, if the contactor 106p experiences a closing failure, the fuel cell current Ifc flows out from the fuel cell 14 (i.e., electrical energy is acquired). That is, the fuel cell current Ifc, which can flow out (be acquired) from the fuel cell as mention above, corresponds to the predetermined current value Ith. Specifically, if a fuel cell current Ifc that is larger than the predetermined current value Ith flows out from the fuel cell 14, performance of the fuel cell 14 will be degraded. Accordingly, the determination in step S13 is performed, in order to limit the fuel cell current Ifc that flows out from the fuel cell 14 to a value which is equal to or smaller than the predetermined current value Ith, so as not to degrade the performance of the fuel cell 14. Specifically, the auxiliary device load limiting means 78 limits the power consumption of the air compressor 36, so as to remain at a value that is smaller than the power limit value Pfclim, indicating the electrical power that can be acquired from the fuel cell 14.

If the determination is negative in step S13, i.e., if it is determined that Ifclim<Ith, the control device 70 records, in a log file, data representing that a closing failure could not be detected during the present contactor failure determination in step S14. Next, in step S15, the control device 70 switches the negative-side contactor 106n so as to assume an opened state, whereupon the present failure detecting mode is finished. Further, driving of the air compressor 36 for conducting the scavenging process is stopped, after the air compressor 36 has been operated for a predetermined time period by the energy storage device 16 and the DC/DC converter 44.

On the other hand, for example, if the fuel cell 14 has operated normally until time t21, the determination becomes positive in step S13. In this case, on the assumption that the contactor 106p may possibly be experiencing a closing failure state, the control device 70 calculates a target value of the load voltage Vld that is controlled by the DC/DC converter 44, such that the fuel cell current Ifc becomes smaller than the current limit value Ifclim (Ifc<Ifclim), in step S16. The target value of the load voltage Vld is designated by dots, as shown in the time charts of FIGS. 6B and 7B.

In step S17, the control device 70 controls the DC/DC converter 44 so as to set the load voltage Vld at the target value.

In step S18, it is determined whether a predetermined time period corresponding to the failure detection determining time period Tc (Tc<Ta) has elapsed or not. If it is determined that the time period Tc has not yet elapsed, the sequence of steps S12, S13 (yes), S16 and S17 is continued. On the other hand, if it is determined that the predetermined time period corresponding to the failure detection determining time period Tc has elapsed, i.e., the determination is positive in step S18, the control device 70 stops the DC/DC converter 44, which controls the target value of the load voltage Vld. Then, a determination of closing failure of the contactor 106p is performed in step S19.

In step S19, determination of closing failure is performed based on whether or not the load voltage Vld is smaller than the fuel cell voltage Vfc (Vld<Vfc).

In this case, if the contactor 106p assumes a normal opened state at time t21 in accordance with the opening command of step S11, while the load voltage Vld gradually decreases to the target value, as in the case between time t21 and time t24 as shown in FIG. 6B, the fuel cell voltage Vfc does not change. Thus, since Vld<Vfc at time t24, the determination becomes positive in step S19.

Accordingly, in the failure detection determining time period Tc, at the ending time t24 thereof, if the determination is positive in step S19 (Vld<Vfc), the control device 70 records, in a log file, data representing that a closing failure has not occurred during the present contactor failure determination time period (i.e., the contactor operates normally), in step S20. Then, in step S15, corresponding to time t24, the negative-side contactor 106n is switched so as to assume an opened state, whereupon the present failure detecting mode is finished.

Also, after time t24, the DC/DC converter 44 no longer controls the target value of the load voltage Vld. Specifically, the control device 70 turns the DC/DC converter 44 off at time t24, and thus the load voltage Vld decreases, depending on a time constant determined by the condenser 52 and the discharge resistor 54. That is, the condenser 52 discharges the stored charge through the discharge resistor 54.

Electrical power consumption shall be described below with reference to FIG. 6C. The air compressor 36 is driven from time t21 to time t23 in order to conduct a scavenging process, thereby consuming a constant amount of electrical power, i.e., the power consumption Pair of the air compressor 36 is constant. After time t23, at which the scavenging process is finished, the power consumption Pair becomes zero. Between time t21 and time t23, the power consumption Pair of the air compressor 36 is substantially equal to the sum of the battery power Pbat, which is generated as a result of discharging the energy storage device 16 through the DC/DC converter 44, and the discharged power Pdis of the condenser 52. The energy storage device 16 is charged with the discharged power Pdis through the DC/DC converter 44 between time t23 and time t24.

Figure 7B:
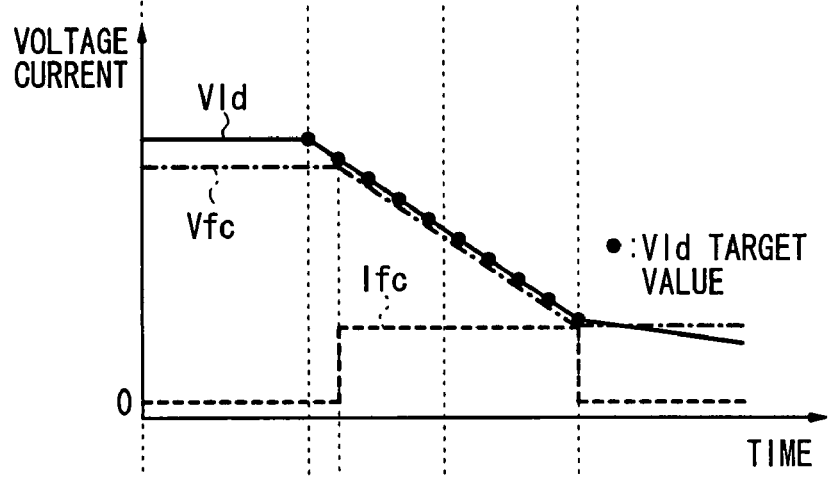
FIG. 7B is a characteristic graph showing changes in current and voltage when a contactor does not experience a closing failure, according to the first example.
Figure 7C:
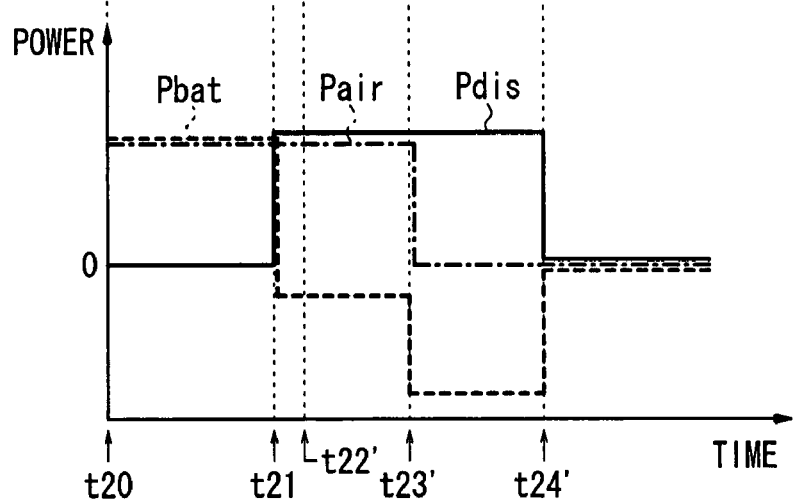
FIG. 7C is a characteristic graph showing changes in electrical power when a contactor experiences a closing failure, according to the first example.
Figure 8:
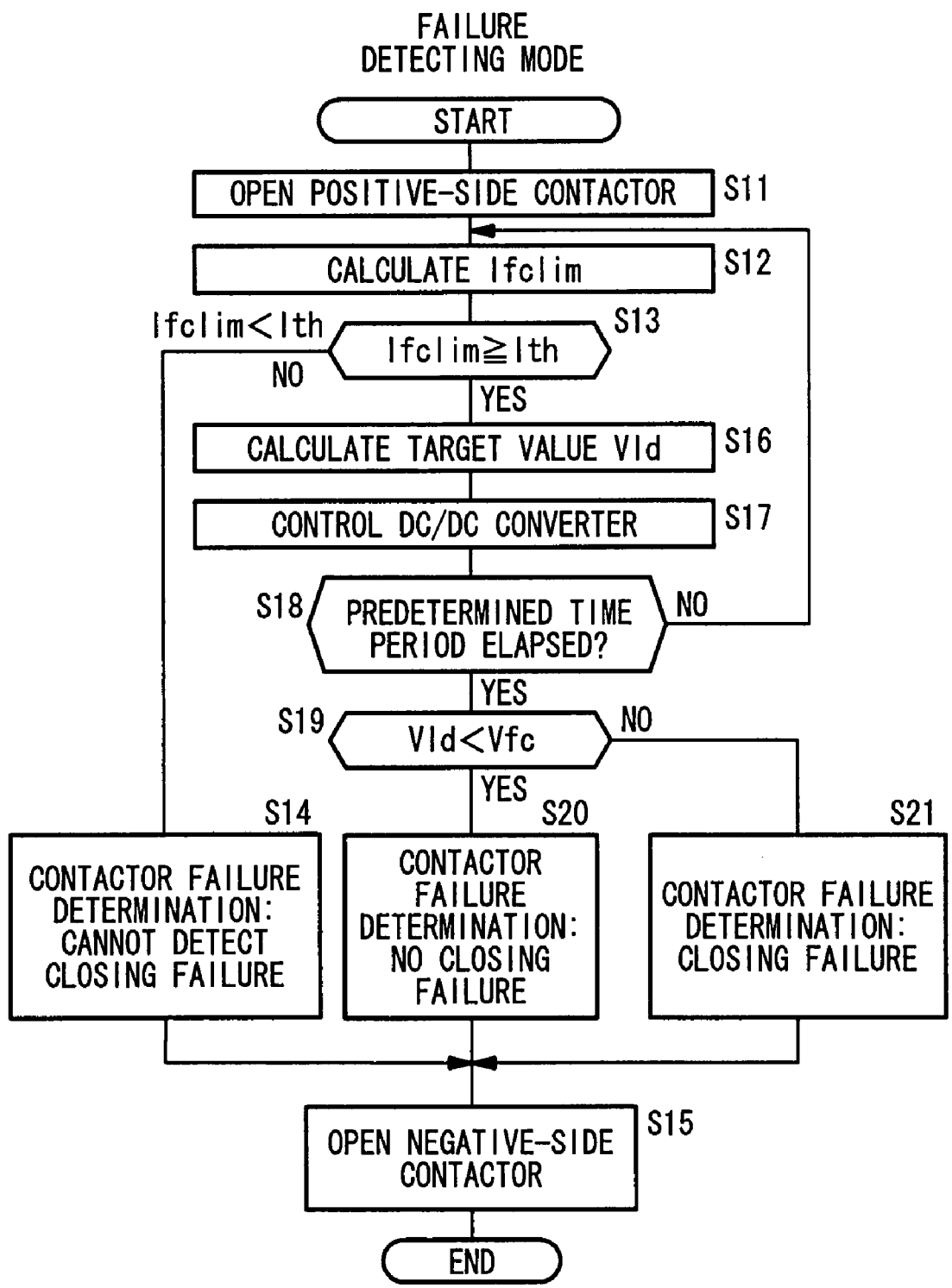
FIG. 8 is a flow chart showing operations according to the first example.

On the other hand, when the contactor 106p does not open but remains in a closed state (i.e., a closing failure occurs) due to melting adhesion, etc., of the contacts of the contactor 106p, although an opening command is transmitted in step S11, as shown in FIG. 7B, only the load voltage Vld reduces until time t22', according to control of the DC/DC converter 44, at which time the diode 108 switches from a cutoff state to a forward biased state. However, after time t22', the diode 108 is in a forward biased state, and thus, the output terminal 29 of the fuel cell 14 and the load side line 50 are brought into electrical contact with each other. Then, the fuel cell voltage Vfc of the fuel cell 14 decreases to the target value after time t22', according to the output control of the DC/DC converter 44.

Accordingly, between time t21 and t24', i.e., during the closing failure detection determining time period Tc, the load voltage Vld and the fuel cell voltage Vfc are reduced simultaneously and sequentially to the target value.

Therefore, Vld≈Vfc, and the determination of Vld<Vfc becomes negative in step S19.

Stated otherwise, in step S19, at the ending time t24' of the failure detection determining time period Tc and after lapse of a predetermined time period from the starting time t21, the load voltage Vld does not become smaller than the fuel cell voltage Vfc, taking into consideration the change characteristics of the load voltage Vld, as shown in FIG. 7B. Based on the above, the closing failure detecting means 76 can determine and detect a closing failure of the contactor 106p.

Incidentally, in the case of a closing failure of the contactor 106p, the fuel cell current Ifc flows out, and thus the fuel cell current Ifc increases between time t22' and time t24' (see FIG. 7B).

In step S21, the control device 70 records, in a log file, data representing that a closing failure has been detected during the present contactor failure determination. Then, in step S15, corresponding to time t24', the negative-side contactor 106n is switched so as to assume an opened state, whereupon the present failure detecting mode is finished.

Also, after time t24', the DC/DC converter 44 no longer controls the target value of the load voltage Vld. Specifically, the control device 70 turns the DC/DC converter 44 off at time t24', and thus the load voltage Vld decreases, depending on a time constant determined by the condenser 52 and the discharge resistor 54. That is, the condenser 52 discharges the stored charge through the discharge resistor 54.

Electrical power consumption shall be described below, with reference to FIG. 7C. The air compressor 36 is driven from time t21 to time t23' for conducting a scavenging process, thereby consuming a constant amount of electrical power, i.e., the power consumption Pair of the air compressor 36 is constant. After time t23' at which the scavenging process is finished, the power consumption Pair becomes zero.

The power consumption Pair of the air compressor 36, between time t12 and time t23', is compensated by a resultant discharge in electrical power Pdis, i.e., the sum of the electrical power collected from the fuel cell 14 and the discharged electrical power from the condenser 52. Thus, between time t21 and time t23', the energy storage device 16 is charged at the battery electrical power Pbat through the DC/DC converter 44, with the remaining discharged electrical power of the condenser 52. Further, between time t23' and t24', the energy storage device 16 is charged at the battery electrical power Pbat, which is equal to the resultant discharged electrical power Pdis.

Incidentally, a closing failure in step S19 may be determined by the following criteria:

A closing failure is determined, (1) if the load voltage Vld does not become smaller than the fuel cell voltage Vfc;

(2) if the fuel cell voltage Vfc changes; or (3) if the fuel cell current Ifc becomes larger than a predetermined current value.

According to the first example, a closing failure of the negative-side contactor 106n can also be detected, as with the above-mentioned process. For example, a closing failure of the positive-side contactor 106p may be detected during a failure detecting mode when operation is stopped at a present time, and a closing failure of the negative-side contactor 106n may be detected during a failure detecting mode when operation is stopped at a subsequent time.

According to the contactor failure detecting apparatus used in the fuel cell system 10 according to the first example, the control device 70 transmits an opening command to the contactor 106p, and thereafter changes the voltage on the input side of the DC/DC converter 44, the input of which is connected to a load. Then, the control device 70 monitors changes in at least one of a voltage, a current, and an electrical power on at least one of a fuel cell 14 side and a load side of the contactor 106p, for thereby detecting a closing failure of the contactor 106p. Therefore, when the contactor 106p does not experience a closing failure, i.e., when the contactor 106p assumes a normal opened state in response to the opening command, the fuel cell voltage Vfc of the fuel cell 14 that is connected to one side of the contactor 106p remains constant, while the load voltage Vld (i.e., the voltage on the input side of the DC/DC converter 44 that is connected to the other side of the contactor 106p) decreases. Therefore, when the load voltage Vld (i.e., the voltage on the input side of the DC/DC converter 44) changes, the control device 70 can monitor changes in at least one of a voltage, a current, and an electrical power on at least one of a fuel cell 14 side and a load side of the contactor 106p, for thereby detecting a closing failure of the contactor 106p. In this case, since the control device 70 controls changes in the voltage on the input side of the DC/DC converter 44, compared to the first basic technique, failures can be detected more quickly.

When the load voltage Vld (i.e., the voltage on the input side of the DC/DC converter 44) is changed, the control device 70 controls changes in voltage on the input side of the DC/DC converter 44, such that a current limit value Ifclim of the fuel cell current Ifc that is collected from the fuel cell 14 is smaller than a predetermined current value (threshold current) Ith. Thus, overloading of the fuel cell 14 can be prevented, thereby avoiding degradation in performance of the fuel cell 14.

Further, during the process of detecting closing failure of the contactor 106p, the control device 70 drives the air compressor 36, which functions to supply the fuel cell 14 with an oxygen-containing gas, and which is connected to the load voltage Vld side, for conducting a scavenging process of the fuel cell 14. Therefore, a long down time of the fuel cell system 10, as a result of detecting failure of the contactor 106p, is prevented.

Also, even if the air compressor 36 is not driven, it is still possible to quickly reduce the load voltage Vld by the DC/DC converter 44, thereby allowing the closing failure detection determining time period Tc to be shorter than the closing failure detection determining time period Ta.

Second Example

Figure 9:
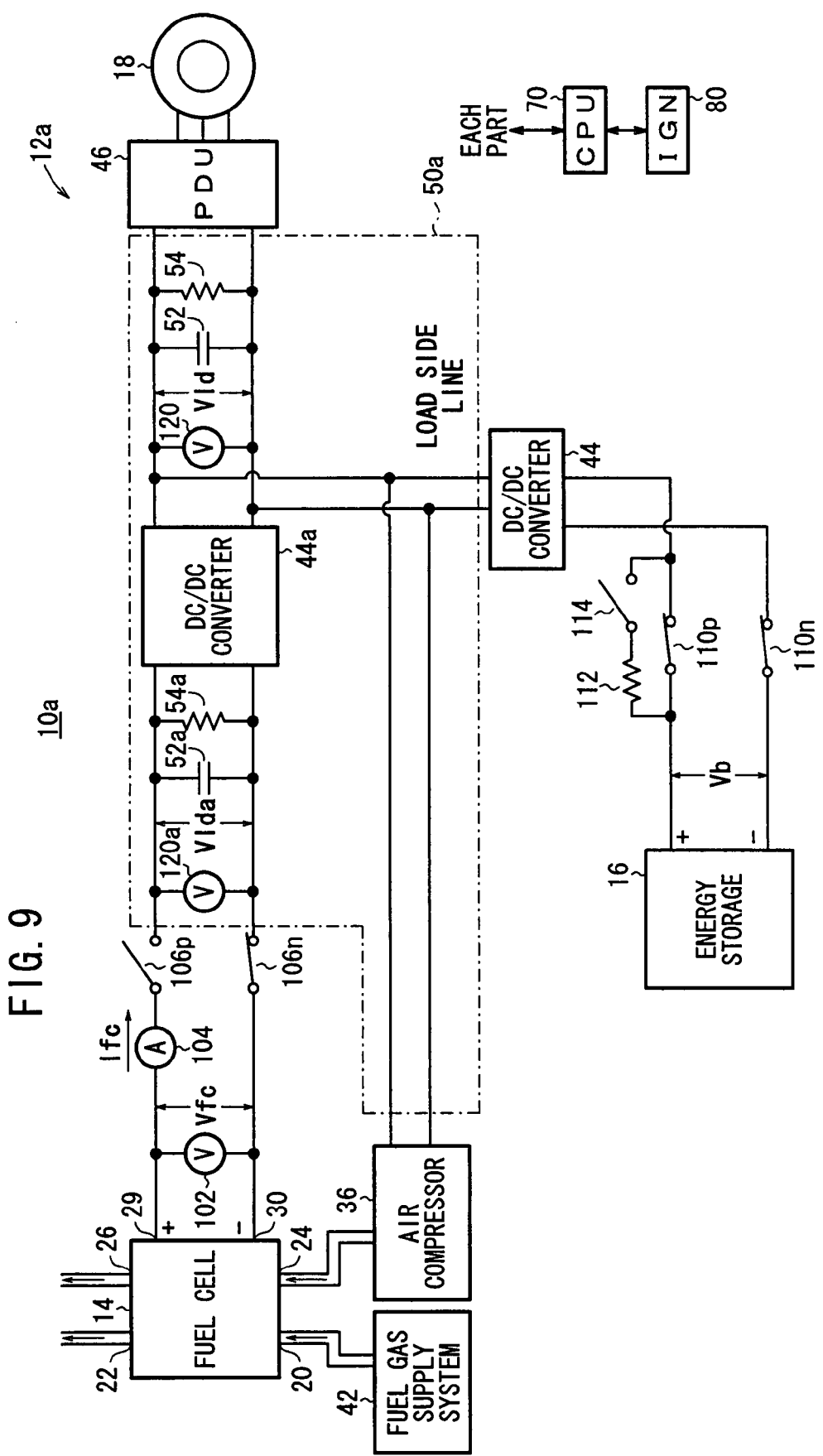
FIG. 9 is a circuit diagram showing schematically a fuel cell vehicle equipped with a fuel cell system according to a second example of the present invention.

FIG. 9 is a diagram schematically showing the structure of a fuel cell vehicle 12a, which is equipped with a fuel cell system 10a according to a second exemplary embodiment of the present invention. In FIG. 9, constituent elements that are identical or correspond to those shown in FIG. 1 are labeled using the same reference numerals, and detailed descriptions of such features shall be omitted.

Unlike the fuel cell system 10 shown in FIG. 1, in the fuel cell system 10a shown in FIG. 9, another voltmeter 120a for measuring the load voltage Vlda, another condenser 52a, another discharge resistor 54a, and a unidirectional (i.e., convertible in only one direction) DC/DC converter 44a are provided on the load side of the contactors 106p and 106n, in order to increase the fuel cell voltage Vfc and to up-convert to the load voltage Vld. The diode 108 also is omitted in the arrangement of FIG. 9. Unlike the fuel cell system 10 of FIG. 1, the fuel cell system 10a can be applied in cases where a fuel cell 14 is used that has a low output voltage (fuel cell voltage Vfc). Further, the fuel cell system 10a can be applied to cases in which a motor 18 that is driven at a high voltage is used. In the fuel cell system 10a of FIG. 9, the load side line 50a includes the voltmeter 120a, the condenser 52a, the discharge resistor 54a, and the DC/DC converter 44a.

The second example shall be described below with reference to the time chart shown in FIGS. 10A to 10C, which indicates normal operation of the contactor 106p, the time chart shown in FIGS. 11A to 11C, which indicates a closing failure of the contactor 106p, and the flowchart shown in FIG. 12, which indicates operations performed during a failure detecting mode. The main body for executing (i.e., for controlling) such operations is the control device 70.

Figure 10A:
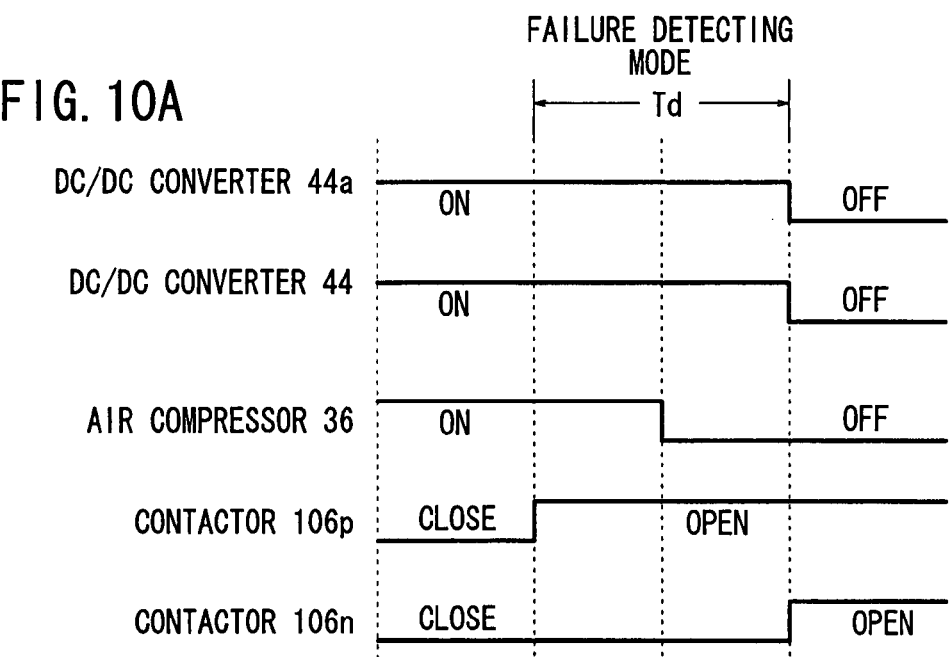
FIG. 10A is a time chart showing operations during a failure detecting mode according to a second example.
Figure 11A:
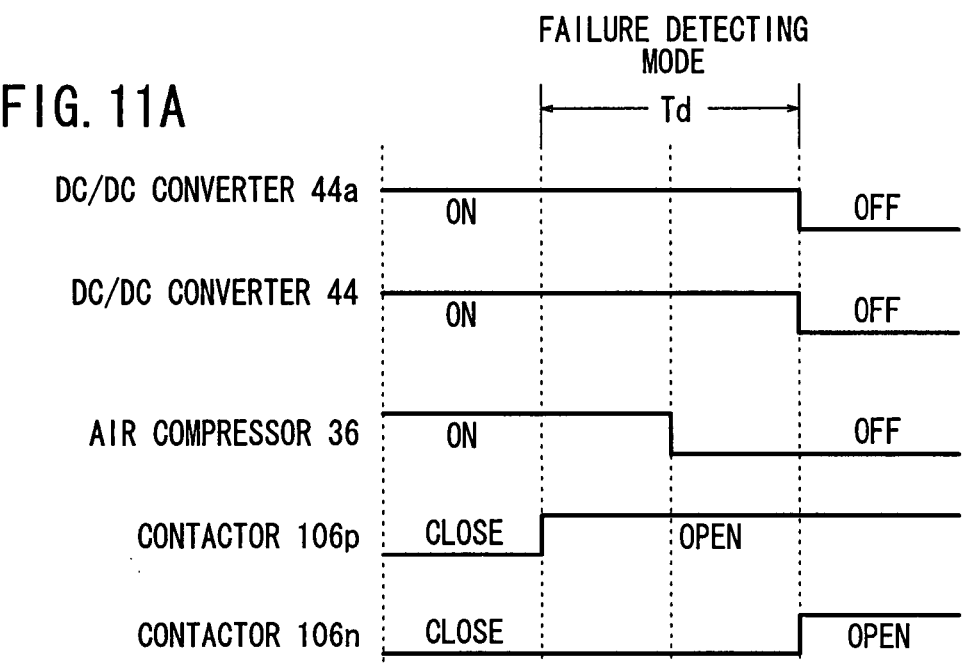
FIG. 11A is similar to FIG. 10A, and is a time chart showing operations during a failure detecting mode according to a second example.

For example, when operation of the fuel cell system 10a is stopped, the contactors 106p, 106n and the contactors 110p, 110n are placed in a closed state between time t20 and time t21, prior to entering the failure detecting mode, which starts at time t21 as shown in FIG. 10A, and the DC/DC converter 44a is placed in an ON state. Further, the load voltage Vld is set to be higher than the fuel cell voltage Vfc (Vld>Vfc). Also, the DC/DC converter 44 is placed in an ON state for performing either up-converting or down-converting.

Figure 10B:
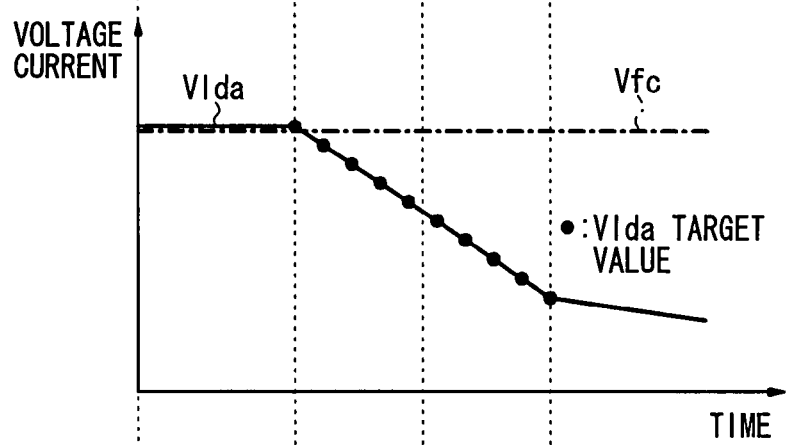
FIG. 10B is a characteristic graph showing changes in voltage when a contactor does not experience a closing failure, according to the first example.
Figure 10C:
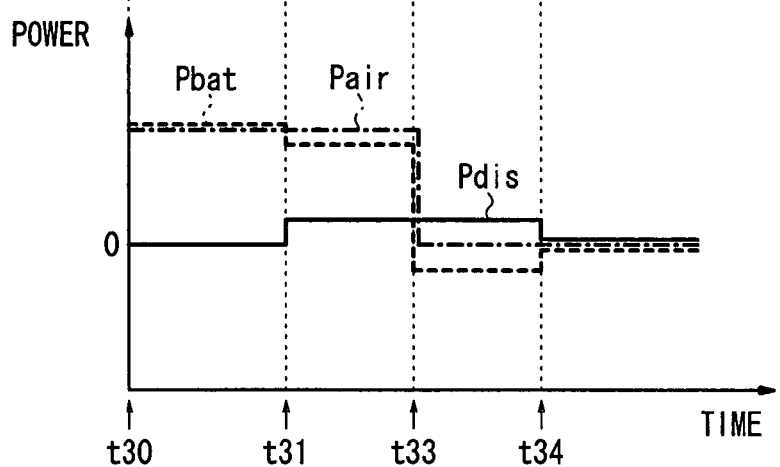
FIG. 10C is a characteristic graph showing changes in electrical power when a contactor experiences a closing failure, according to the first example.
Figure 11B:
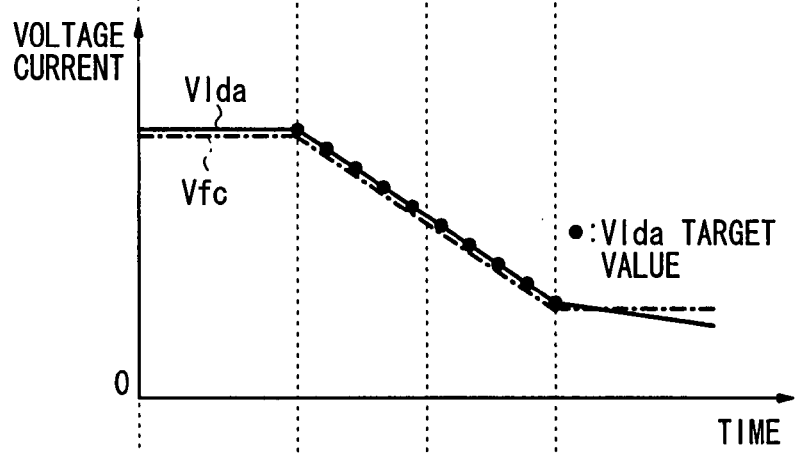
FIG. 11B is a characteristic graph showing changes in voltage when a contactor does not experience a closing failure, according to the first example.
Figure 11C:
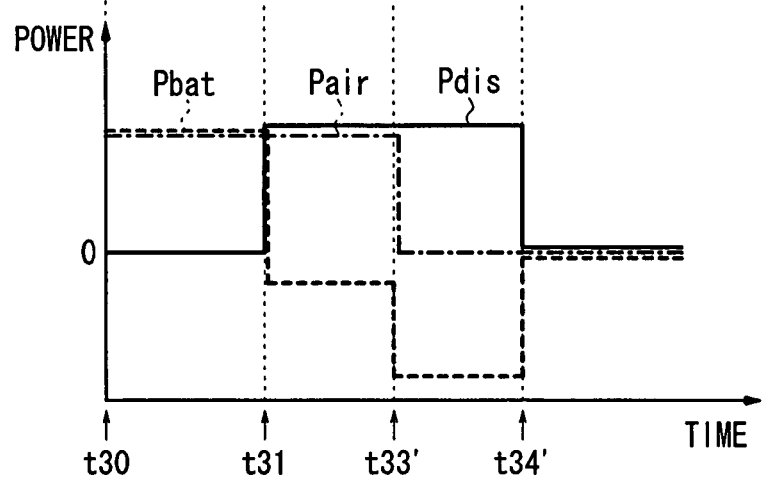
FIG. 11C is a characteristic graph showing changes in electrical power when a contactor experiences a closing failure, according to the first example.
Figure 12:
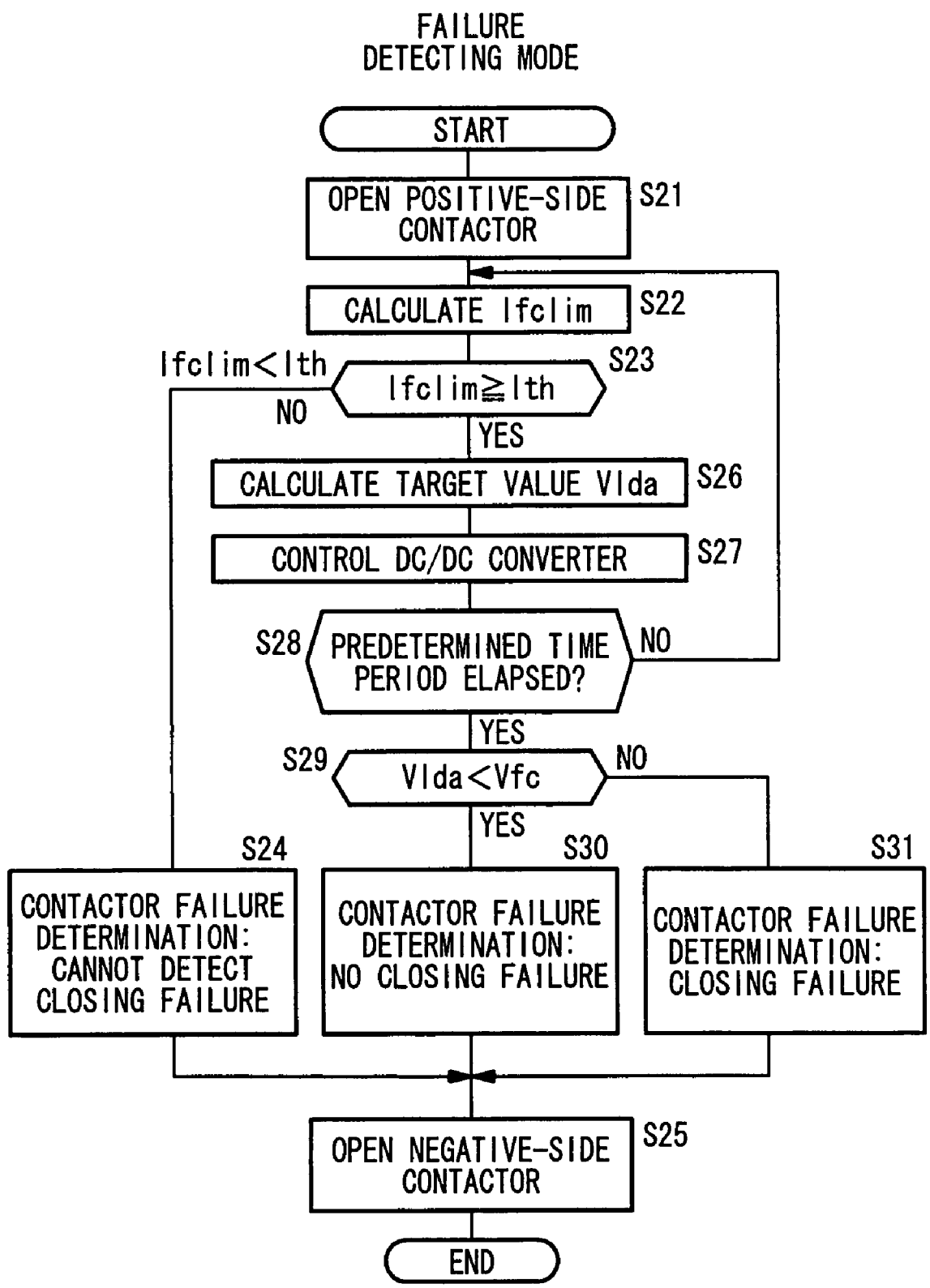
FIG. 12 is a flow chart showing operations according to the second example.

As shown in FIGS. 10B and 11B, since the contactors 106p, 106n are placed in a closed state, between time t30 and time t31, the load voltage Vlda is equal to the fuel cell voltage Vfc (Vlda=Vfc).

When the failure detecting mode is started at time t31, the control device 70 controls the contactor opening command transmitting means 72 so as to transmit an opening command to the positive-side contactor 106p in step S21. Also, at this time, the control device 70 drives the air compressor 36, in response to a scavenging request for scavenging the fuel cell 14 (ex. a request to discharge water produced at the cathode and anode using air, when operation of the system is stopped after a power generation operation has continued for a predetermined time period). In the second example, the air compressor 36 is driven in response to a scavenging request at time t31.

Next, in step S22, the control device 70 calculates a current limit value Ifclim, indicating the current that can be collected from the fuel cell 14, from the pressure, the flow rate of the present fuel gas, the fuel cell voltage, the fuel cell temperature, etc.

Then, in step S23, the control device 70 determines whether the current limit value Ifclim calculated in step S22 is equal to or larger than a predetermined current value (threshold current) Ith (Ifclim≧Ith). When the load voltage Vlda is decreased by an input feedback control of the DC/DC converter 44a during the failure detecting mode, if the contactor 106p experiences a closing failure, the fuel cell current Ifc flows out from the fuel cell 14 (i.e., electrical energy is acquired). That is, the fuel cell current Ifc, which can flow out (be acquired) from the fuel cell as mention above, corresponds to the predetermined current value Ith. Specifically, if a fuel cell current Ifc that is larger than the predetermined current value Ith flows out from the fuel cell 14, performance of the fuel cell 14 will be degraded. Accordingly, the determination in step S23 is performed, in order to limit the fuel cell current Ifc that flows out from the fuel cell 14 to a value which is equal to or smaller than the predetermined current value Ith, so as not to degrade the performance of the fuel cell 14.

If the determination is negative in step S23, i.e., if it is determined that Ifclim<Ith, the control device 70 records, in a log file, data representing that a closing failure could not be detected during the present contactor failure determination in step S24. Next, in this case, the control device 70 switches the negative-side contactor 106n so as to assume an opened state in step S25, whereupon the present failure detecting mode is finished. Further, driving of the air compressor 36 for conducting the scavenging process is stopped, after the air compressor 36 has been operated for a predetermined time period by the energy storage device 16 and the DC/DC converter 44.

On the other hand, for example, if the fuel cell 14 has operated normally until time t31, the determination becomes positive in step S23. In this case, on the assumption that the contactor 106p may possibly be experiencing a closing failure state, the control device 70 calculates a target value of the load voltage Vlda (i.e., a voltage on the input side of the DC/DC converter 44a) that is controlled by the DC/DC converter 44a, such that the fuel cell current Ifc becomes smaller than the current limit value Ifclim (Ifc<Ifclim), in step S26. The target value of the load voltage Vlda is designated by dots, as shown in the time charts of FIGS. 10B and 11B.

In step S27, the control device 70 controls the DC/DC converter 44a so as to set the load voltage Vlda at the target value.

In step S28, it is determined whether a predetermined time period corresponding to the failure detection determining time period Td (Td<Ta) has elapsed or not. If it is determined that the time period has not yet elapsed, the sequence of steps S22, S23 (yes), S26 and S27 is continued. On the other hand, if it is determined that the predetermined time period corresponding to the failure detection determining time period Td has elapsed, i.e., the determination is positive in step S28, the control device 70 stops the DC/DC converter 44a, which controls the target value of the load voltage Vlda. Then, a determination of closing failure of the contactor 106p is performed in step S29.

In step S29, determination of closing failure is performed based on whether or not the load voltage Vlda is smaller than the fuel cell voltage Vfc (Vlda<Vfc).

In this case, if the contactor 106p assumes a normal opened state at time t31 in accordance with the opening command of step S21, while the load voltage Vlda gradually decreases to the target value, as in the case between t31 and t33 as shown in FIG. 10B, the fuel cell voltage Vfc does not change. Thus, since Vlda<Vfc at time t34, the determination becomes positive in step S29.

Accordingly, in the failure detection determining time period Td, at the ending time t34 thereof, if the determination is positive in step S29 (Vlda<Vfc), the control device 70 records, in a log file, data representing that a closing failure has not occurred during the present contactor failure determination time period (i.e., the contactor operates normally), in step S30. Then, in step S25, corresponding to time t34, the negative-side contactor 106n is switched so as to assume an opened state, whereupon the present failure detecting mode is finished.

Also, after time t34, the DC/DC converter 44a no longer controls the target value of the load voltage Vlda. Specifically, the control device 70 turns the DC/DC converter 44a off at time t34, and thus the load voltage Vlda decreases, depending on a time constant determined by the condenser 52a and the discharge resistor 54a. That is, the condenser 52a discharges the stored charge through the discharge resistor 54a.

Electrical power consumption shall be described below with reference to FIG. 10C. The air compressor 36 is driven from time t31 to time t33 in order to conduct a scavenging process, thereby consuming a constant amount of electrical power, i.e., the power consumption Pair of the air compressor 36 is constant. After time t33 at which the scavenging process is finished, the power consumption Pair becomes zero. Between time t31 and time t33, the power consumption Pair of the air compressor 36 is substantially equal to the sum of the battery power Pbat, which is generated as a result of discharging the energy storage device 16 through the DC/DC converter 44, and the discharged power Pdis of the condenser 52a. The energy storage device 16 is charged at the battery power Pbat, with the discharged power Pdis, through the DC/DC converter 44 between time t33 and time t34.

On the other hand, when the contactor 106p does not open but remains in a closed state (i.e., a closing failure occurs) due to melting adhesion, etc., of the contacts of the contactor 106p, although an opening command is transmitted in step S21, the output terminal 29 of the fuel cell 14 and the load side line 50 are brought into electrical contact with each other. Then, as shown in FIG. 11B, the fuel cell voltage Vfc of the fuel cell 14 decreases to the target value after time t31, according to the output control of the DC/DC converter 44.

Accordingly, between time t31 and t34', i.e., during the closing failure detection determining time period Td, the load voltage Vlda and the fuel cell voltage Vfc are reduced simultaneously to the target value.

Therefore, Vlda≈Vfc, and the determination of Vlda<Vfc becomes negative in step S29.

Stated otherwise, in step S29, at the ending time t34' of the failure detection determining time period Td and after lapse of a predetermined time period from the starting time t31, the load voltage Vlda does not become smaller than the fuel cell voltage Vfc, taking into consideration the change characteristics of the load voltage Vlda, as shown in FIG. 11B. Based on the above, the closing failure detecting means 76 can determine and detect a closing failure of the contactor 106p.

In step S31, the control device 70 records, in a log file, data representing that a closing failure has been detected during the present contactor failure determination. Then, in step S25, corresponding to time t34', the negative-side contactor 106n is switched so as to assume an opened state, whereupon the present failure detecting mode is finished.

Also, after time t34', the DC/DC converter 44a no longer controls the target value of the load voltage Vlda. Specifically, the control device 70 turns the DC/DC converter 44a off at time t34', and thus the load voltage Vlda decreases, depending on a time constant determined by the condenser 52a and the discharge resistor 54a. That is, the condenser 52a discharges the stored charge through the discharge resistor 54a.

Electrical power consumption shall be described below, with reference to FIG. 1C. The air compressor 36 is driven from time t31 to time t33' for conducting a scavenging process, thereby consuming a constant amount of electrical power, i.e., the power consumption Pair of the air compressor 36 is constant. After time t33' at which the scavenging process is finished, the power consumption Pair becomes zero.

The power consumption Pair of the air compressor 36, between time t31 and time t33', is compensated by a resultant discharge in electrical power Pdis, i.e., the sum of the electrical power collected from the fuel cell 14 and the discharged electrical power from the condenser 52. Thus, between time t31 and time t33', the energy storage device 16 is charged at the battery electrical power Pbat through the DC/DC converter 44, with the remaining discharged electrical power of the condenser 52. Further, between time t33' and t34', the energy storage device 16 is charged at the battery electrical power Pbat, which is equal to the resultant discharged electrical power Pdis.

Incidentally, a closing failure in step S29 may be determined by the following criteria:

A closing failure is determined, (1) if the load voltage Vlda does not become smaller than the fuel cell voltage Vfc;

(2) if the fuel cell voltage Vfc changes; or (3) if the fuel cell current Ifc becomes larger than a predetermined current value.

According to the second example, a closing failure of the negative-side contactor 106n can also be detected, as with the above-mentioned process. For example, a closing failure of the positive-side contactor 106p may be detected during a failure detecting mode when operation is stopped at a present time, and a closing failure of the negative-side contactor 106n may be detected during a failure detecting mode when operation is stopped at a subsequent time.

According to the contactor failure detecting apparatus used in the fuel cell system 10a according to the second example, the control device 70 transmits an opening command to the contactor 106p, and thereafter changes the voltage on the input side of the DC/DC converter 44a, the input of which is connected to the fuel cell 14 through the contactors 106p, 106n. Then, the control device 70 monitors changes in at least one of a voltage, a current, and an electrical power on at least one of a fuel cell 14 side of the contactor 106p and an input side of the DC/DC converter 44a, for thereby detecting a closing failure of the contactor 106p. Therefore, when the contactor 106p does not experience a closing failure, i.e., when the contactor 106p assumes a normal opened state in response to the opening command, the fuel cell voltage Vfc of the fuel cell 14 that is connected to one side of the contactor 106p remains constant, while the load voltage Vlda (i.e., the voltage on the input side of the DC/DC converter 44a that is connected to the other side of the contactor 106p) decreases. Therefore, when the load voltage Vlda (i.e., the voltage on the input side of the DC/DC converter 44a) changes, the control device 70 can monitor changes in at least one of a voltage, a current, and an electrical power on at least one of a fuel cell 14 side of the contactor 106p and an input side of the DC/DC converter 44a, for thereby detecting a closing failure of the contactor 106p. In this case, since the control device 70 controls changes in the voltage on the input side of the DC/DC converter 44a, compared to the first basic technique, failures can be detected more quickly.

When the load voltage Vlda (i.e., the voltage on the input side of the DC/DC converter 44a) is changed, the control device 70 controls the change in voltage on the input side of the DC/DC converter 44a, such that the current limit value Ifclim of the fuel cell current Ifc that is collected from the fuel cell 14 is smaller than the predetermined current value (threshold current) Ith. Thus, overloading of the fuel cell 14 can be prevented, thereby avoiding degradation in performance of the fuel cell 14.

Further, during the process of detecting a closing failure of the contactor 106p, the control device 70 drives the air compressor 36, which supplies the fuel cell 14 with oxygen-containing gas and which is connected to the load voltage Vld side, for conducting a process of scavenging the fuel cell 14. Accordingly, a long down time of the fuel cell system 10, as a result of detecting failure of the contactor 106p, can be prevented.

Also, even if the air compressor 36 is not driven, it is still possible to quickly reduce the load voltage Vlda by means of the DC/DC converter 44a, thereby allowing the closing failure detection determining time period Td to be shorter than the closing failure detecting time Ta.

In accordance with the first and second examples, contactors 106p, 106n, for connecting or disconnecting the motor 18 from a fuel cell 14, are disposed between the fuel cell 14 and the motor 18, which forms a load that is supplied with electrical energy from the fuel cell 14. With this arrangement, failure of the contactors 106p, 106n can be detected. Further, such failure of the contactors 106p, 106n can be detected quickly by controlling the voltage on the input side of the DC/DC converters 44, 44a. For example, based on the presence or absence of a relatively large voltage difference (Vld−Vfc), at the starting time t21 and at the ending time t24 of the failure detecting mode, a closing failure of the contactor 106p can be detected quickly.

While the invention has been particularly shown and described with reference to preferred embodiments thereof, it should be understood that variations and modifications can be made to the invention by persons skilled in the art without departing from the spirit and scope of the invention as set forth in the appended claims.

What is claimed is:

1. A contactor failure detecting apparatus for use in a fuel cell system comprising:
    a fuel cell generates power by reaction of a fuel gas and an oxygen-containing gas, the fuel cell producing a fuel cell voltage (Vfc);
    a DC/DC converter increases an output voltage of said fuel cell so as to achieve a predetermined voltage;
    a load driven by an output voltage of said DC/DC converter, the load having a load voltage (Vld);
    a contactor opens and closes in order to electrically connect and disconnect said fuel cell with respect to said load through said DC/DC converter, said contactor having one end thereof connected to an output side of said fuel cell and another end thereof connected to an input side of said DC/DC converter;
    an energy storage device connected to said fuel cell through said DC/DC converter; and
    a control device programmed to:
    transmit a close command to said contactor;
    increase, following the close command, a voltage of the energy storage device so that the load voltage Vld is made higher than the fuel cell voltage Vfc (Vld>Vfc);
    transmit, following the increase of voltage, an 'open' command to said contactor;
    monitor the Vld and Vfc for a pre-determined time period; and
    identify, based on the monitoring, a contactor failure when said Vld and said Vfc are substantially equal at the end of the pre-determined time period.

2. A contactor failure detecting apparatus for use in a fuel cell system according to claim 1, wherein said control device controls a change in said voltage on said input side of said DC/DC converter such that an electrical power of said fuel cell is smaller than a predetermined electrical power limit value.

3. A contactor failure detecting apparatus for use in a fuel cell system according to claim 1, further comprising:
    an air compressor for supplying said oxygen-containing gas to said fuel cell, connected to said load side through an electrical input side of said air compressor,
    wherein, while detecting a closing failure of said contactor, said control device drives said air compressor for scavenging said fuel cell.

* * * * *